United States Patent
Sutskover et al.

(10) Patent No.: US 11,463,962 B2
(45) Date of Patent: Oct. 4, 2022

(54) TRANSMISSION POWER CONTROL BASED ON RELATIVE DURATIONS OF TRANSMISSION SECTIONS

(71) Applicant: Intel Corporation, Santa Clara, CA (US)

(72) Inventors: Ilan Sutskover, Hadera (IL); Roy Amel, Haifa (IL); Slava Vaysman, Nazareth Illit (IL); Shahar Gross, Nes-Tziona (IL); Wilfrid D'Angelo, Mougins (FR)

(73) Assignee: Intel Corporation, Santa Clara, CA (US)

( * ) Notice: Subject to any disclaimer, the term of this patent is extended or adjusted under 35 U.S.C. 154(b) by 142 days.

(21) Appl. No.: 16/639,595

(22) PCT Filed: Sep. 7, 2018

(86) PCT No.: PCT/US2018/049822
§ 371 (c)(1),
(2) Date: Feb. 17, 2020

(87) PCT Pub. No.: WO2019/055289
PCT Pub. Date: Mar. 21, 2019

(65) Prior Publication Data
US 2021/0400595 A1 Dec. 23, 2021

Related U.S. Application Data

(60) Provisional application No. 62/559,683, filed on Sep. 18, 2017.

(51) Int. Cl.
H04W 52/22 (2009.01)
H04W 52/14 (2009.01)

(52) U.S. Cl.
CPC ....... *H04W 52/226* (2013.01); *H04W 52/146* (2013.01)

(58) Field of Classification Search
CPC . H04W 52/226; H04W 51/146; H04W 52/30; H04W 52/38; H04W 52/28;
(Continued)

(56) References Cited

U.S. PATENT DOCUMENTS

2012/0106422 A1 5/2012 Hultell et al.
2014/0135004 A1 5/2014 Patel et al.
(Continued)

FOREIGN PATENT DOCUMENTS

EP 2762835 A2 8/2014

OTHER PUBLICATIONS

International Search Report issued for the international counterpart application No. PCT/US2018/049822, dated Dec. 19, 2018, 4 pages.
(Continued)

*Primary Examiner* — Philip Sobutka
(74) *Attorney, Agent, or Firm* — Viering, Jentschura & Partner MBB

(57) ABSTRACT

A wireless device includes a controller configured to identify a scheduled transmission including a first section having a first bandwidth and a second section having a second bandwidth, select a transmit power limit for the scheduled transmission based on a relative duration of the first section compared to the second section, and select a transmit power value based on the transmit power limit, and a transmitter configured to perform the scheduled transmission with a transmit power indicated by the transmit power value.

13 Claims, 25 Drawing Sheets

(58) Field of Classification Search
CPC . H04W 72/12; H04W 52/246; H04W 52/267; H04W 52/283; H04W 52/367; H04W 52/42
See application file for complete search history.

(56) References Cited

U.S. PATENT DOCUMENTS

2016/0029391 A1   1/2016  D'Souza et al.
2016/0255594 A1*  9/2016  Vajapeyam ......... H04W 52/346
                                                   455/522
2017/0332286 A1* 11/2017  Lepp ................ H04W 52/0212

OTHER PUBLICATIONS

IEEE, "Draft Standard for Information technology—Telecommunications and information exchange between systems Local and metropolitan area networks—Specific requirements", Institute of Electrical and Electronics Engineers (IEEE), Apr. 2017, 490 pages, P802.11 AX TM/ D1.2.

* cited by examiner

| WiFi Channel | 2MHz Rus TX power limit [dBm] | | | |
|---|---|---|---|---|
| | Short Packets | | Long Packets | |
| | Chain A | Chain B | Chain A | Chain B |
| 1 | 14 | 15 | 18 | 18 |
| 2 | 20 | 20 | 20 | 20 |
| 3 | 20 | 20 | 20 | 20 |
| 4 | 20 | 20 | 20 | 20 |
| 5 | 20 | 20 | 20 | 20 |
| 6 | 20 | 20 | 20 | 20 |
| 7 | 20 | 20 | 20 | 20 |
| 8 | 20 | 20 | 20 | 20 |
| 9 | 20 | 20 | 20 | 20 |
| 10 | 20 | 20 | 20 | 20 |
| 11 | 15 | 15 | 18 | 19 |
| 12 | 13 | 13 | 15 | 15 |
| 13 | 5 | 5 | 9 | 9 |

| Channel | OOB emission restriction Relative duration range (WB to NB) | | | | PSD emission restriction Relative duration range (WB to NB) | | | |
|---|---|---|---|---|---|---|---|---|
| | 1 | 2 | 3 | 4 | 1 | 2 | 3 | 4 |
| 1 | 14 | 13 | 12 | 10 | 10 | 12 | 15 | 18 |
| 2 | 16 | 14 | 12 | 10 | 10 | 12 | 16 | 18 |
| 3 | 18 | 17 | 15 | 12 | 12 | 15 | 17 | 19 |
| 4 | 19 | 17 | 16 | 15 | 10 | 12 | 13 | 18 |
| 5 | 20 | 18 | 17 | 16 | 10 | 12 | 12 | 18 |
| 6 | 20 | 20 | 19 | 17 | 11 | 13 | 14 | 19 |
| 7 | 20 | 20 | 20 | 18 | 10 | 11 | 14 | 18 |
| 8 | 20 | 20 | 20 | 20 | 10 | 12 | 15 | 17 |

|  | 2MHz RUs Tx power limit [dBm] | | | |
|---|---|---|---|---|
|  | Short Packets 2301 | | Long Packets 2302 | |
| 2303 WiFi Channel | 2304 Chain A | 2305 Chain B | Chain A | Chain B |
| 1 | 14 | 15 | 18 | 18 |
| 2 | 20 | 20 | 20 | 20 |
| 3 | 20 | 20 | 20 | 20 |
| 4 | 20 | 20 | 20 | 20 |
| 5 | 20 | 20 | 20 | 20 |
| 6 | 20 | 20 | 20 | 20 |
| 7 | 20 | 20 | 20 | 20 |
| 8 | 20 | 20 | 20 | 20 |
| 9 | 20 | 20 | 20 | 20 |
| 10 | 20 | 20 | 20 | 20 |
| 11 | 15 | 15 | 18 | 19 |
| 12 | 13 | 13 | 15 | 15 |
| 13 | 5 | 5 | 9 | 9 |

TRANSMISSION POWER CONTROL BASED ON RELATIVE DURATIONS OF TRANSMISSION SECTIONS

CROSS-REFERENCE TO RELATED APPLICATIONS

This application is a national stage entry, according to 35 U.S.C. § 371, of PCT Application No. PCT/US2018/049822 filed on Sep. 7, 2018, which claims priority to U.S. Patent Application Ser. No. 62/559,683, filed on Sep. 18, 2017, which are both incorporated herein by reference in their entirety.

TECHNICAL FIELD

Various embodiments relate generally to methods and devices for controlling transmit power in wireless devices.

BACKGROUND

Many regulatory agencies impose restrictions on radio activity by various wireless devices. For example, the Federal Communications Commission (FCC) and the European Telecommunications Standards Institute (ETSI) are responsible for regulating wireless activity by devices operating in the United States and Europe, respectively. For example, these regulatory agencies may enforce regulations that limit transmissions by wireless devices to remain below certain maximum transmit power levels. Wireless devices subject to these regulations may therefore control their transmit powers to ensure that transmissions remain below the maximum transmit power levels

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 9 shows an exemplary lookup table based on channel, packet duration, and transmit chain according to some aspects;

FIG. 10 shows an exemplary lookup table based on channel, emission restriction type, and relative wideband to narrowband duration according to some aspects;

FIG. 23 shows an exemplary table with stored maximum transmit power values corresponding to packet size and channel;

DESCRIPTION

Figure 1:
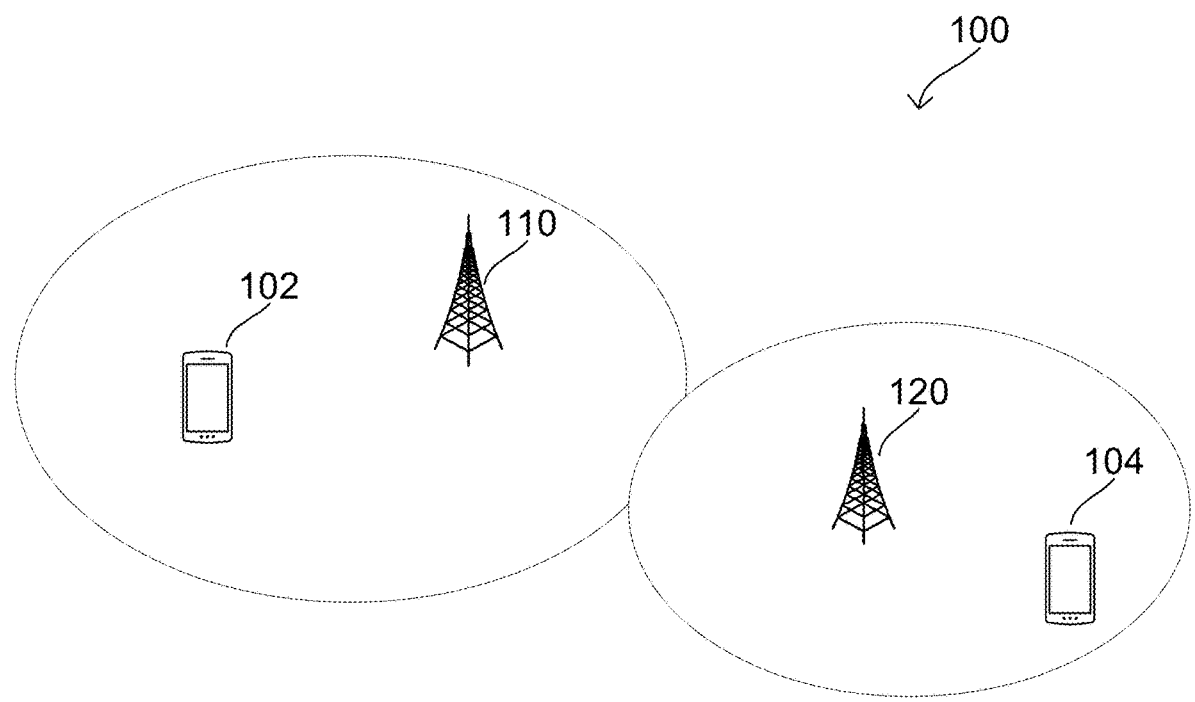
FIG. 1 shows an exemplary diagram of a wireless communication network according to some aspects.

The following detailed description refers to the accompanying drawings that show, by way of illustration, specific details and aspects of embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", among others, and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

As used herein, "memory" are understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Furthermore, registers, shift registers, processor registers, data buffers, among others, are also embraced herein by the term memory.

The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), gNodeBs, Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax), 5G New Radio (NR), for example, and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations.

Figure 2:
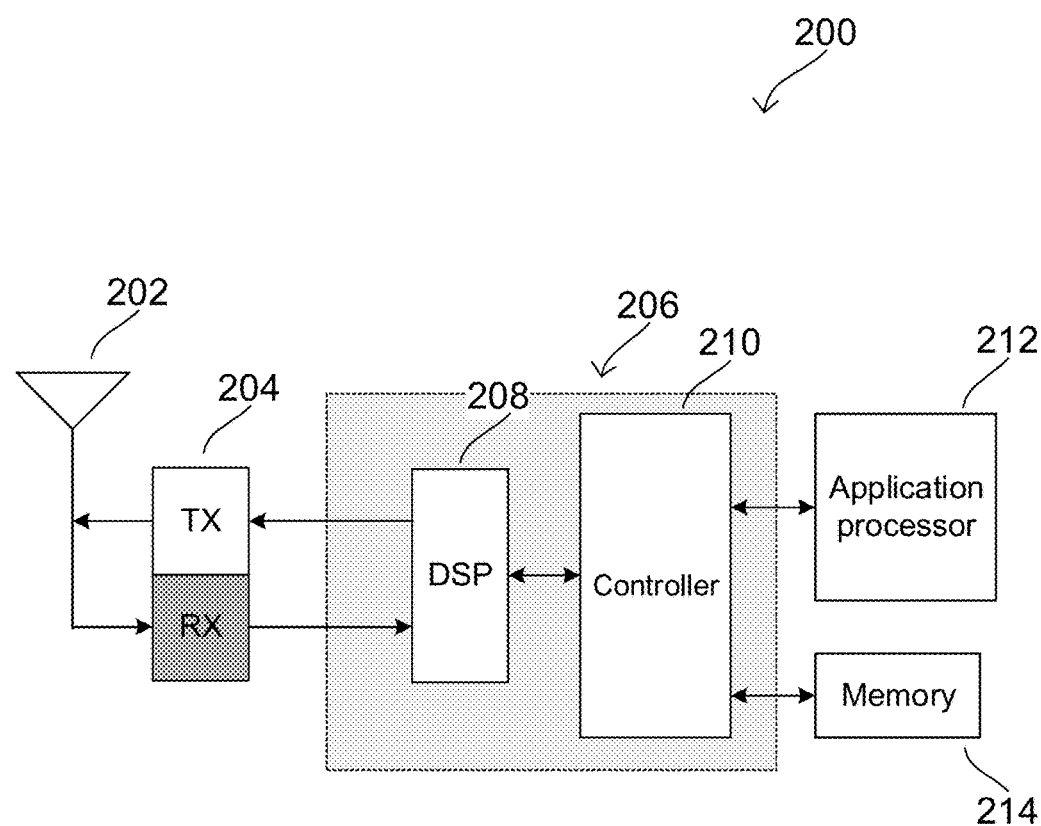
FIG. 2 shows an exemplary internal configuration of a terminal device according to some aspects.

FIGS. 1 and 2 depict a general network and device architecture for wireless communications. In particular, FIG. 1 shows exemplary radio communication network 100 according to some aspects, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G NR, mmWave, etc.), these examples are demonstrative and may therefore be readily applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, such as for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 100.

FIG. 2 shows an internal configuration of wireless device 200 according to some aspects, which may include antenna system 202, radio frequency (RF) transceiver 204, baseband modem 206 (including digital signal processor 208 and protocol controller 210), application processor 212, and memory 214. Although not explicitly shown in FIG. 2, in some aspects wireless device 200 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

In various aspects, wireless device 200 may operate as either a terminal device or a network access node. Wireless device 200 may transmit and receive radio signals on one or more radio access networks. Baseband modem 206 may direct such communication functionality of wireless device 200 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of wireless device 200 shown in FIG. 2 depicts only a single instance of such components.

Wireless device 200 may transmit and receive wireless signals with antenna system 202, which may be a single antenna or an antenna array that includes multiple antennas. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Wireless device 200 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of wireless device 200 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of wireless device 200 to transmit and receive communication signals in accordance with the corresponding protocol stack control logic defined in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio wireless device 200 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

Wireless device 200 may also include application processor 212 and memory 214. Application processor 212 may be a CPU and may be configured to handle the layers above the protocol stack, including the transport and application layers. Application processor 212 may be configured to execute various applications and/or programs of wireless device 200 at an application layer of wireless device 200, such as an operating system (OS), a user interface (UI) for supporting user interaction with wireless device 200, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of wireless device 200, such as a hard drive or another such permanent memory device. Although not explicitly depicted in FIG. 2, the various other components of wireless device 200 shown in FIG. 2 may additionally each include integrated permanent and non-permanent memory components, such as for storing software program code, buffering data, etc.

Many wireless devices may be configured to abide by transmit power limitations. For example, wireless regulators in certain countries or regions may specify regulatory requirements that govern wireless transmission activity by wireless devices. Some of these regulatory requirements, such as those found in the US and Europe, may place restrictions on transmit power levels used by wireless devices. Depending on the regulator, these regulatory requirements may be specified in different manners and/or using different limitations. For example, the Federal Communications Commission (FCC) in the US utilizes an out-of-band (OOB) emission restriction for transmitters that mandates that the transmit power remain below −41.2 dBm/MHz Equivalent Isotropically Radiated Power (EIRP) on OOB frequencies adjacent to the bands where WiFi devices operate (e.g., the Industrial, Scientific, and Medical (ISM) band, Unlicensed National Information Infrastructure (U-NII) band, and any other bands that support WiFi). The FCC also mandates a power spectral density (PSD) emission restriction that limits transmissions (including in-band) to below a certain level. While the FCC provides both OOB and PSD emission restrictions, the OOB emission restrictions are generally considered to be stricter for band-edge channels and compliance is thus largely dominated by the OOB emission restrictions in the band-edge. Channels located further from the band-edge (e.g., in the center of the band) may be dominated by PSD restrictions.

European regulators such as the European Telecommunications Standards Institute (ETSI) also mandate OOB and PSD emission restrictions. However, in contrast to the stricter OOB emission restrictions of the FCC, the PSD emission restrictions by the ETSI are considered stricter than the OOB emission restrictions. Accordingly, while US compliance is weighted towards the OOB emission restrictions, European compliance is dominated by compliance with the PSD emission restrictions. Many other countries also follow the same US or European regulations and may mandate certification procedures where communication devices are tested to determine whether or not they are complying with the emission restrictions. While WiFi is used here as an example, other radio access technologies are also subject to these emission restrictions. For example, transmitters of other radio access technologies may also be subject to the same or similar emission restrictions. Aspects of this disclosure are therefore not limited to any particular radio access technology. Furthermore, many wireless devices may also be limited in their transmit power by their own transmitter capabilities, which may not be able to effectively transmit above certain transmit powers at specific frequencies.

Many communication devices may use internal tables of transmit power limitations to help comply with the various regulatory requirements. These transmit power limitations can be stored in a one-time programmable memory (OTP), such as on a platform non-volatile memory (PNVM) on the communication device or on an on-chip memory of a RAT-specific card (e.g., a standalone WiFi and/or Bluetooth card). The transmit power limitations in these tables may be indexed by various input parameters, such as different numbers and types of transmitting antennas, different channels or spectrum ranges, different bandwidths, and/or various transmission modes. When the communication device is operating, it may determine what its current parameters are and subsequently access the table to determine a transmit power limit. Assuming the table has been properly populated with transmit power limitations, the communication device may be able to transmit at or below this transmit power limit without violating the emission restrictions.

Certain types of packets, however, may complicate compliance with various emission restrictions. One such example is found in IEEE 802.11ax WiFi, which includes a special type of OFDMA triggered uplink packet. These packets use a wideband legacy preamble to which a new narrowband data transmission is attached. The legacy wideband preamble, transmitted in a standard WiFi wideband format (e.g., 20 MHz, 40 MHz, 80 MHz, or 160 MHz), may allow backwards compatibility with legacy devices (e.g., WiFi devices operating according to previous WiFi standards). These legacy devices may therefore be able to detect the legacy wideband preamble and recognize it as a WiFi transmission, such as for carrier sensing purposes. In accordance with legacy WiFi standards, the legacy wideband preambles may have a fixed duration in time. By contrast, the narrowband data transmission may be in a new narrowband format, including bandwidths as narrow as 2 MHz (e.g., a single Resource Unit (RU) of 2 MHz bandwidth). These narrowband data transmissions may also have variable duration in time and may therefore have variable length depending on the amount of data to be transmitted.

Figure 3:
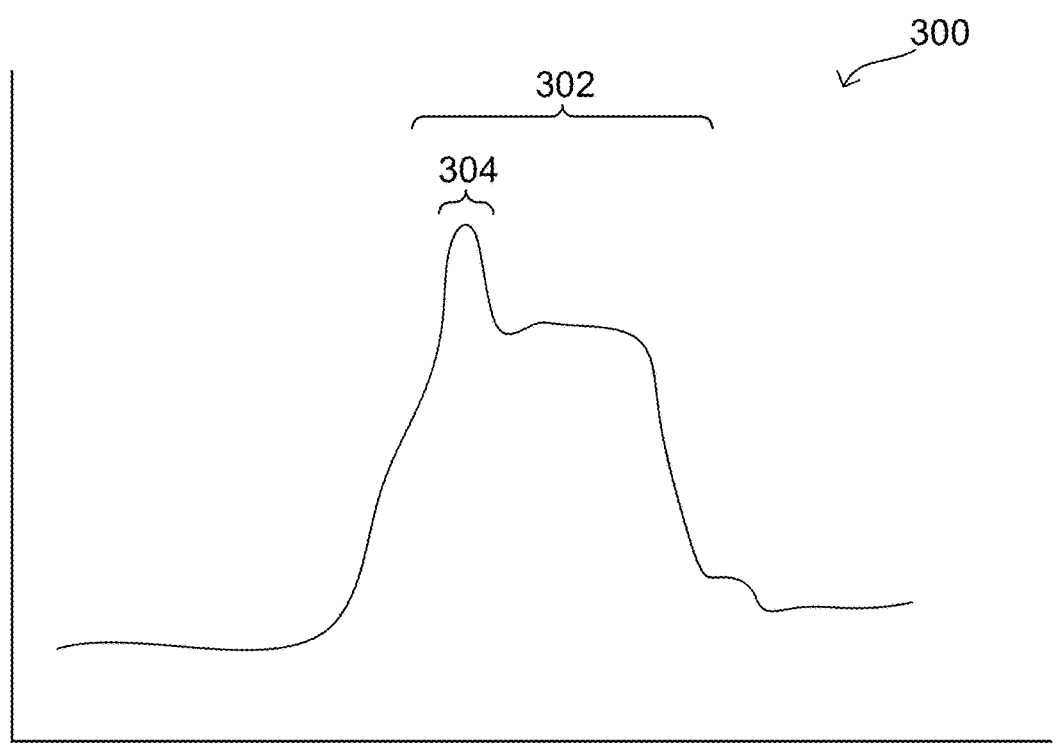
FIG. 3 shows an exemplary illustration of the spectrum of a packet having a wideband and narrowband section according to some aspects.

These new packets may therefore have varying bandwidth over time, where the fixed-length preambles are transmitted with a wider bandwidth than the variable-length data transmission. The combined spectrum of the entire packet will therefore be a superposition of the wideband and narrowband sections. This concept expands generally to any case where a given packet includes two (or more sections) that have different bandwidths. FIG. 3 shows an exemplary spectrum 300 according to some aspects that depicts the spectrum of a packet that has both a narrowband and wideband section. As shown in FIG. 3, the narrowband section may form a ridge in area 304 while the wideband section may cause a wider, plateau-shaped curve in area 302.

Figure 4:
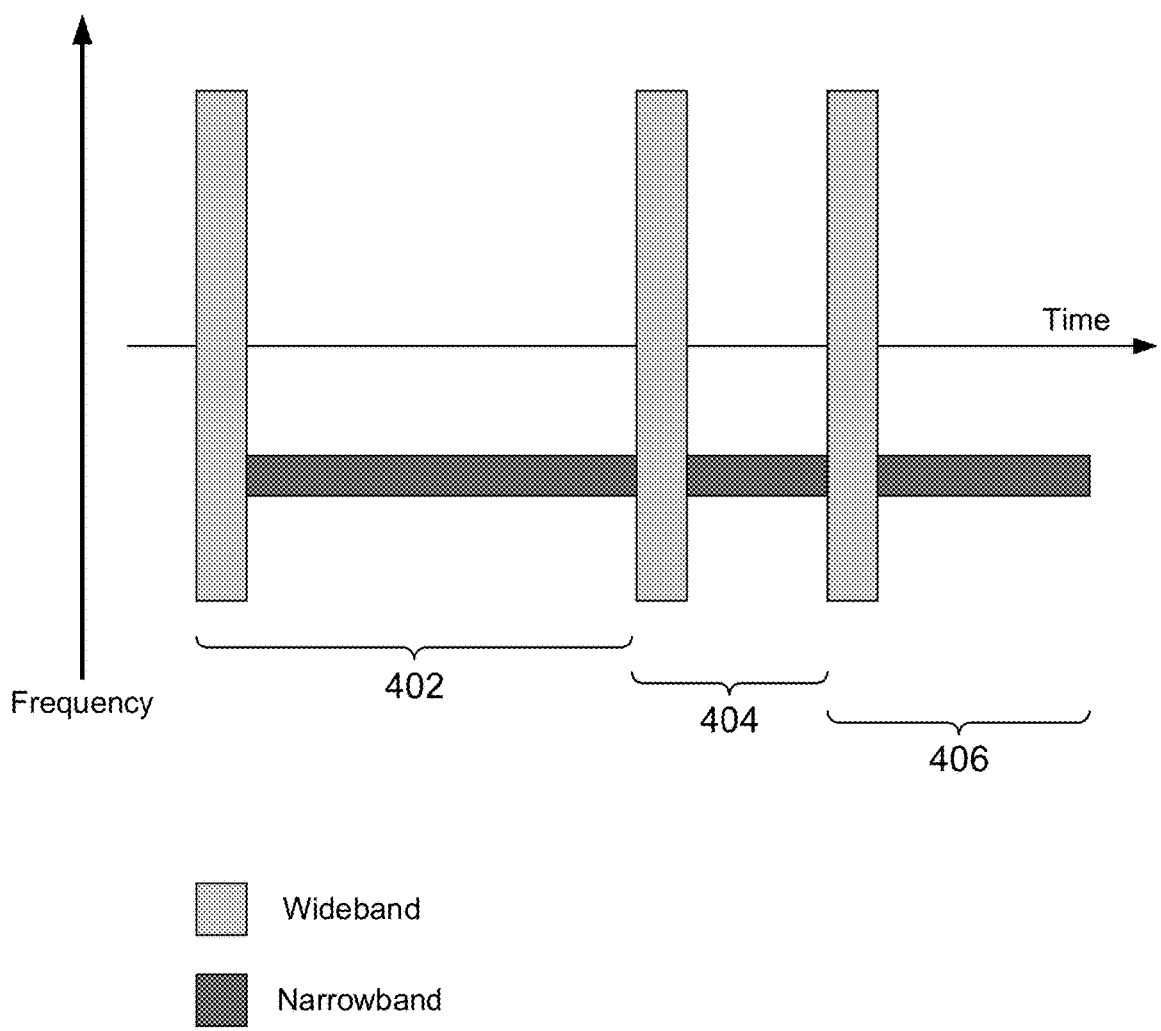
FIG. 4 shows an exemplary time-frequency plot of multiple packets with wideband and narrowband sections according to some aspects.

As the narrowband section has a variable duration, the entire 802.11ax packet may have variable length in time. FIG. 4 shows an exemplary plot of packets 402-406 according to some aspects. As shown in FIG. 4, packets 402-406 may each include a wideband portion of fixed duration and a narrowband portion of variable duration. In the example of FIG. 4, the packets may have a 100% duty cycle, or in other words, there may not be any silence periods around or between the wideband and narrowband sections. This is not limiting and various other applicable examples can use packets with silence periods.

As shown in FIG. 4, the narrowband portion of packet 402 may be longer than the narrowband portions of packets 404 and 406, and packet 402 may therefore have a longer duration than both of packets 404 and 406. Packets 404 and 406 may have narrowband portions with relatively short length, where the narrowband portion of packet 406 is slightly longer than the narrowband portion of packet 406. This concept applies to both 802.11ax packets (e.g., having a fixed-duration wideband section and a variable-duration narrowband section) as well as to any other packet types that have multiple sections of different bandwidths and varying duration (e.g., including packet types where the wideband and narrowband sections both have variable durations).

The relative duration of the wideband portion compared to the narrowband portion may therefore vary across different packets (e.g., some packets may have longer narrowband portions than others, thus resulting in different relative durations between the wideband and narrowband portions). Depending on this relative duration for a given packet, the spectrum of the packet may more closely resemble either the individual spectrum of the wideband portion or the narrowband portion. For example, if the wideband portion has a significantly longer duration than the narrowband portion, the packet spectrum will be skewed towards the spectrum of the wideband portion (e.g., may more closely resemble the spectrum of the wideband portion than the narrowband section). Conversely, if the narrowband portion has a significantly longer duration than the wideband portion, the packet spectrum will be skewed towards the spectrum of the narrowband portion (e.g., may more closely resemble the spectrum of the wideband section).

Because of this variable-duration multiple-bandwidth characteristic, some packets may more easily comply with emission restrictions than others. For example, signals that behave like wider bandwidth signals may generally produce higher levels of undesired emission outside of the channel than signals that behave like narrower bandwidth signals. Signals that have wideband behavior may therefore be more sensitive to OOB emission restrictions (e.g., may be more susceptible to violating OOB emission restrictions). Conversely, signals that have narrowband behavior may generally have higher PSD than signals with wideband behavior and may therefore be more sensitive to in-band PSD restrictions.

Figure 5:
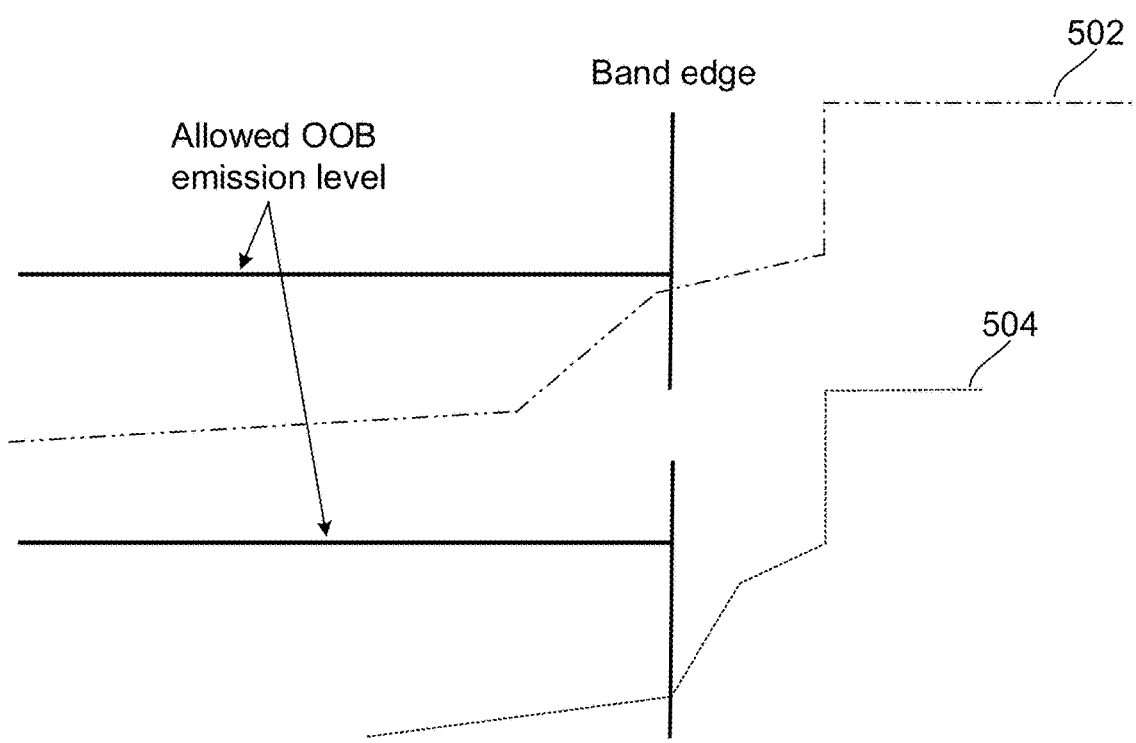
FIG. 5 shows an exemplary spectrum plot of wideband and narrowband signals in relation to an out-of-band (OOB) emission restriction according to some aspects.
Figure 6:
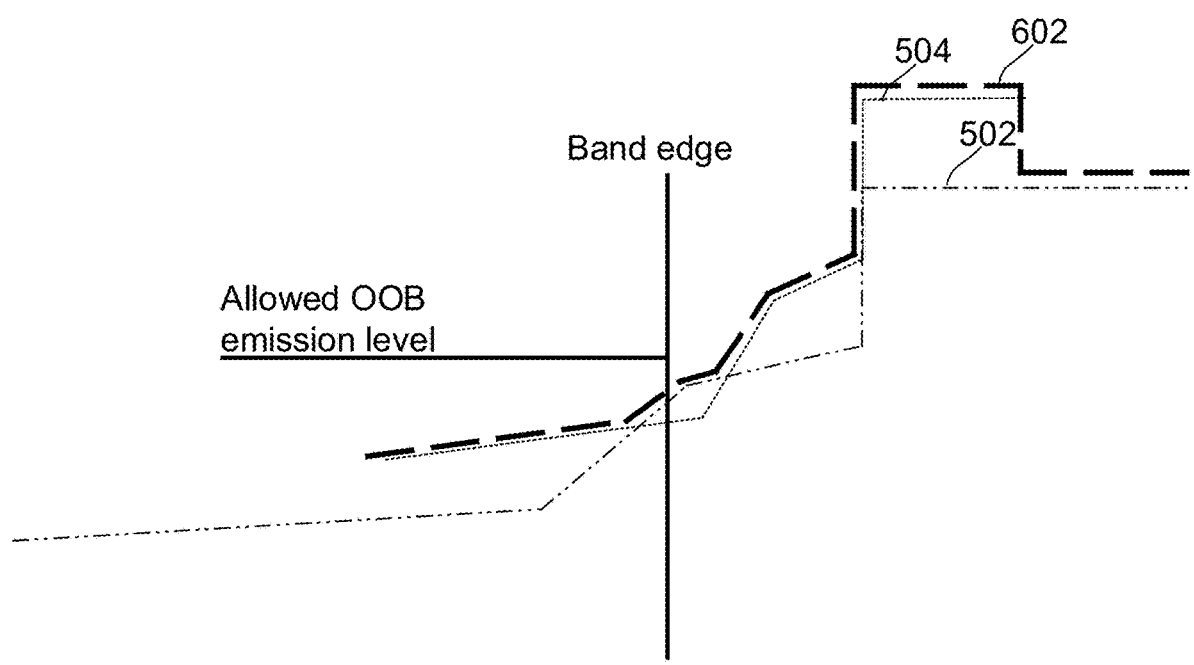
FIG. 6 shows an exemplary spectrum plot of a packet with wideband and narrowband sections in relation to an OOB emission restriction according to some aspects.

FIGS. 5 and 6 depict exemplary illustrations of spectrum for wideband, narrowband, and combined signals for an OOB emission restriction according to some aspects. Starting with FIG. 5, FIG. 5 shows spectrum plots of wideband section 502 and narrowband section 504 relative to the same OOB emission restriction. Accordingly, the OOB emission restriction may specify a frequency that delimits the band edge and a power level that defines the maximum permitted power past the band edge. Wireless devices may abide by the OOB emission restriction by refraining from performing transmissions that exceed the permitted power level past the band edge. As previously indicated, both FCC and ETSI emission restrictions may include OOB emission restrictions, where the FCC OOB emission restrictions are generally considered to be stricter than the ETSI OOB emission restrictions.

FIG. 5 plots the spectrum of a wideband section 502 and a narrowband section 504. As shown in FIG. 5, the spectrum of wideband section 502 may extend further past the band edge than the spectrum of narrowband section 504. In some cases, this is caused by the intermodulation terms of wideband section 502, which are wider in frequency than the intermodulation terms of narrowband section 504. These intermodulation terms are typically caused by interaction across the signal bandwidth of the signal's spectrum parts. As a result, the intermodulation terms of a given signal may have a width in frequency dependent on the bandwidth of a signal, where wider bandwidth signals have wider intermodulation terms. A signal with a wider signal bandwidth will thus have intermodulation terms that leak further from its center frequency than a signal with narrower bandwidth. Because they have more OOB leakage (e.g., higher power levels of OOB leakage), signals with wider bandwidth may not conform to an OOB emission restriction if its transmit power is the same as a narrowband signal (e.g., as the intermodulation terms extend further past the band edge than a narrowband signal).

FIG. 6 plots the spectra of wideband section 502, narrowband section 504, and packet 602, where packet 602 may include wideband section 502 and narrowband section 504 (e.g., concatenated together). As packet 602 includes both wideband section 502 and narrowband section 504, its spectrum may be a weighted superposition of wideband section 502 and narrowband section 504, where the weighting depends on the relative duration of wideband section 502 and narrowband section 504. Accordingly, if narrowband section 504 is significantly longer than wideband section 502 (e.g., if a narrowband data portion is significantly longer than a fixed preamble in 802.11ax), the spectrum of packet 602 may be weighted towards the spectrum of narrowband section 504. As a result, packet 602 may behave more like narrowband section 504 and thus have less OOB leakage than wideband section 502 alone. Conversely, if wideband section 502 is significantly longer than narrowband section 504, the spectrum of packet 602 may be weighted towards the spectrum of wideband section 504. Packet 602 may therefore behave more like wideband section 502 and may have more OOB leakage than narrowband section 504 alone.

Accordingly, depending on the relative duration of wideband section 502 and narrowband section 504, packet 602 may be more or less able to conform with the OOB emission restriction. For example, if a first packet has a wideband section 502 that is significantly longer than its narrowband section 504 and a second packet has a wideband section 502 that is significantly shorter than its narrowband section 504, a wireless device may be able to transmit the second packet with higher transmit power than the first packet and still comply with the OOB emission restriction. In other words, because the second packet behaves more like a narrowband signal than the first packet, the second packet may have less OOB leakage and can therefore be transmitted with more power. In the exemplary case of 802.11ax, longer packets may have narrowband sections with longer relative duration than wideband preamble. These longer packets may therefore have less OOB leakage and as a result can use higher transmit power when the dominant limitation is an OOB emission restriction. This may similarly hold for other types of packets that have multiple sections of different bandwidth and varying duration, where packets that have longer relative durations of the narrowband section may be able to use higher transmit powers.

Unlike OOB emission restrictions, which look at leakage outside of the band, PSD emission restrictions restrict the power level of in-band emissions. Signals that behave like narrowband signals may place more transmit power on a narrower spectrum compared to signals that transmit the same total power over a wider bandwidth. Signals that behave like narrowband signals will therefore produce higher PSD levels. Accordingly, in contrast to OOB emission restrictions, signals that behave more like wideband signals may be able to more easily comply (e.g., able to use more transmit power) with PSD emission restrictions than signals that behave more like narrowband signals. Accordingly, for 802.11ax and similar multi-bandwidth varying duration packets, packets having narrowband sections with shorter relative duration may more easily comply with PSD emission restrictions than packets with longer wideband sections.

The ability of these types of packets to comply with various emission restrictions can therefore vary depending on the type of emission restrictions and the relative duration of the wideband section compared to the narrowband section. Various aspects of this disclosure may therefore include a wireless device configured to select transmit power values for packets based on the applicable type of emission restrictions and the relative duration of the wideband and narrowband sections. In some aspects, wireless devices may use a lookup table (LUT) as part of this transmit power value selection, where the LUT may map various durations of wideband and narrowband sections and emission restrictions to transmit power limits. A wireless device scheduled to transmit a packet may therefore access the LUT using a given emission restriction and relative wideband and narrowband duration of the packet. The wireless device may select a transmit power limit from the LUT and then use the transmit power limit to select a transmit power value for transmitting the packet.

Figure 7:
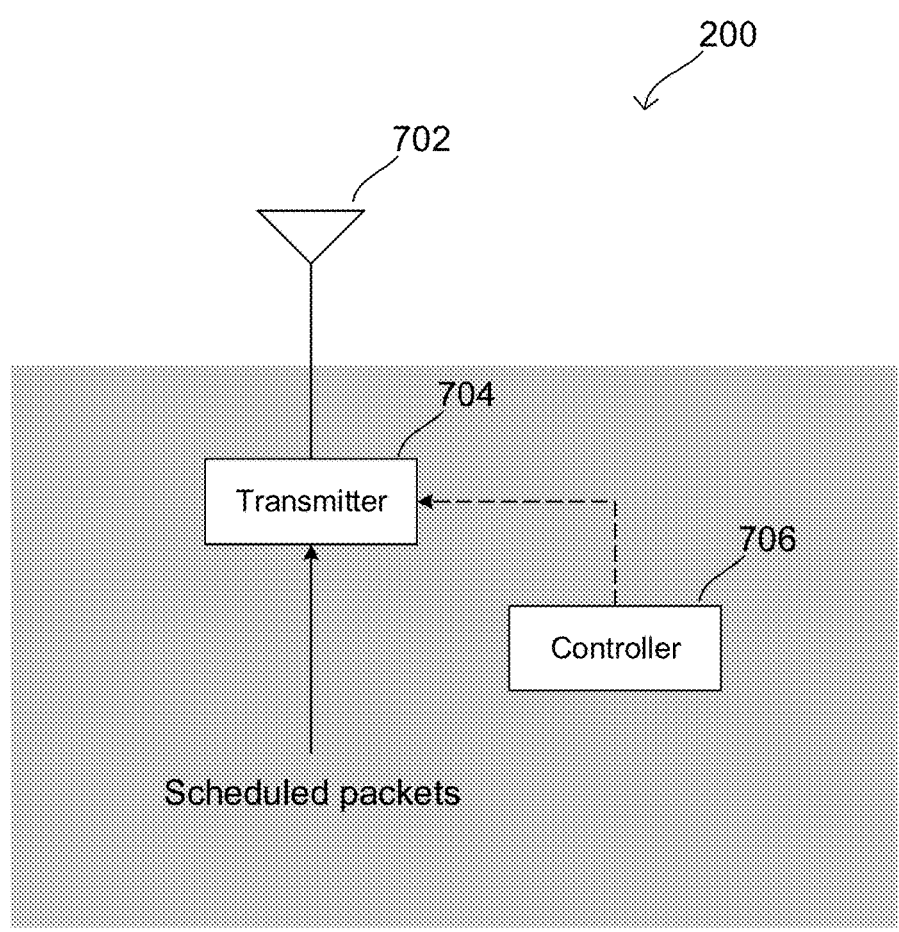
FIG. 7 shows an exemplary internal configuration of a wireless device configured to perform transmit power control according to some aspects.

FIG. 7 shows an exemplary internal configuration of wireless device 200 according to some aspects. The configuration illustrated in FIG. 7 is focused primarily on the transmit power selection operations of wireless device 200, and for explanatory purposes may not expressly depict other components of wireless device 200 that are less directly related to transmit power selection. As shown in FIG. 7, wireless device 200 may include antenna system 702, transmitter 704, and controller 706. As previously discussed regarding FIG. 2, wireless device 200 may include antenna system 202, RF transceiver 204, and baseband modem 206. In some aspects, antenna system 702 may therefore correspond to antenna system 202. Similarly, transmitter 704 and controller 706 may be internal components of RF transceiver 204 and/or baseband modem 206. For example, in some aspects transmitter 704 may be part of RF transceiver 204 and controller 706 may be part of baseband modem 206. Transmitter 704 and controller 706 are not limited to this configuration and are may be any part of wireless device 200.

In some aspects, transmitter 704 may include RF amplification and transmission circuitry and may be configured to transmit signals via antenna system 702. In some aspects, controller 706 may include hardware (e.g., as one or more digitally-configured hardware circuits, such as ASICs, FPGAs, or another type of dedicated hardware circuit) and/or software (e.g., one or more processors configured to retrieve and execute program code that defines arithmetic, control, and/or I/O instructions and is stored in a non-transitory computer-readable storage medium) configured to perform control functions for wireless device 200. In some aspects, controller 706 may perform these control functions via execution of program code and/or via execution of digital logic with dedicated hardware.

Figure 8:
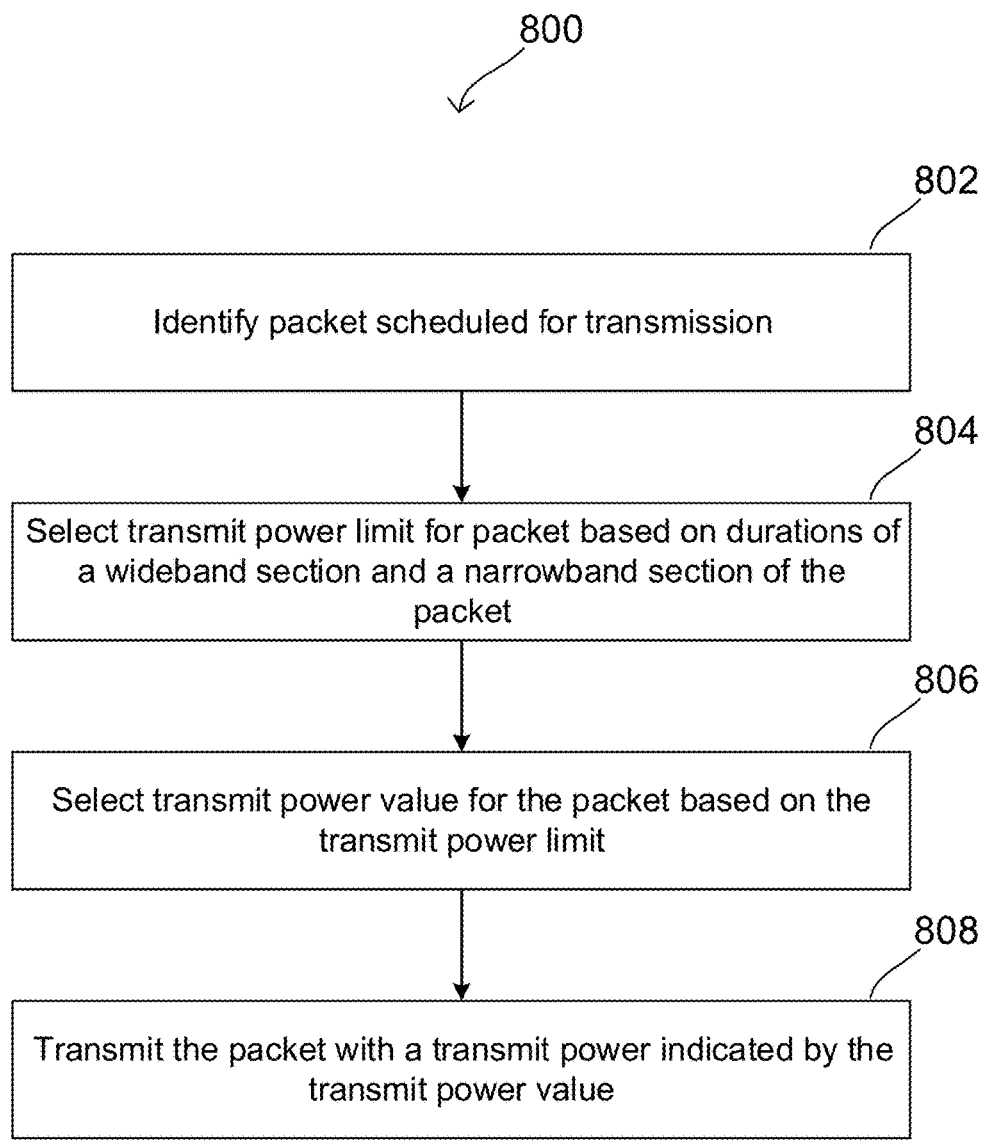
FIG. 8 shows an exemplary method of selecting transmit powers for packets according to some aspects.

FIG. 8 shows exemplary method 800 according to some aspects, which wireless device 200 may be configured to execute to select transmit powers for various packets. In some cases, wireless device 200 may use method 800 to select a transmit power for a packet that has multiple sections of different bandwidths and varying duration, such as 802.11ax packets or other packets with similar bandwidth characteristics. As further described below, wireless device 200 may execute method 800 using antenna system 702, transmitter 704, and controller 706.

As shown in FIG. 8, controller 706 may first identify a packet scheduled for transmission in stage 802 (e.g., a scheduled transmission). For example, wireless device 200 may be configured to transmit a sequence of transmit packets, and the scheduled packet may be any upcoming packet in the sequence of transmit packets. Controller 706 may therefore monitor the packets in the sequence of transmit packets and identify the scheduled packet within the sequence.

After identifying the packet, controller 706 may then select a transmit power limit for the packet based on the durations of a wideband section and a narrowband section of the packet in stage 804. As previously introduced above, wireless device 200 may be able to transmit certain packets with higher transmit power than others depending on the type of emission restriction and the relative durations of the wideband section compared to the narrowband section. Accordingly, wireless device 200 may be able to select a higher transmit power limit for some packets than others.

In some aspects, controller 706 may use a LUT to select the transmit power limit in stage 804. The LUT may specify transmit power limits for various combinations of input parameters, where the parameters can include one or more of a duration parameter related to the durations of the wideband and narrowband sections, emission restriction type, channel or subcarriers, transmission bandwidth, number of antennas, transmit chain, or any other parameter relevant to emissions. Controller 706 may therefore access the LUT with the relevant set of input parameters for the packet and identify the transmit power limit to which the set of input parameters match. The various transmit power limits that are mapped to given sets of input parameters by the LUT may be determined offline (e.g., prior to runtime), and may be selected so that packets transmitted at or below the transmit power limit will comply with the emission restriction (e.g., will have transmit power levels that are less than the power level defined in the emission restriction).

Various types of LUTs can be utilized in various aspects of this disclosure. FIG. 9 shows an exemplary LUT 900 according to some aspects. In the example of FIG. 9, LUT 900 may utilize relative wideband and narrowband duration, transmit chain, and channel as the input parameters for selecting transmit power limits. In this example, controller 706 may classify packets as either 'short' or 'long.' For instance, in the case of 802.11ax (and other packet formats where the narrowband section has variable duration), the wideband section is fixed in duration while the narrowband section has variable duration. Longer packets will have longer narrowband sections than shorter packets and, as a result, will behave more like narrowband signals (e.g., as the narrowband section will be long compared to the wideband section). Controller 706 may therefore utilize a duration threshold to classify the packets, where packets having a duration greater than the duration threshold are classified as long packets while packets having a duration less than the duration threshold are classified as short packets. Using this classification, short packets will have a relative duration of wideband to narrowband that is greater than the relative duration of wideband to narrowband for long packets (as long packets have longer narrowband sections). In one example for 802.11ax, the threshold may be 400 us, where long packets are those longer than (or equal to) 400 us and short packets are those shorter than (or equal to) 400 us.

Continuing with the exemplary LUT of FIG. 9, when controller 706 selects a transmit power limit in stage 804, controller 706 may therefore compare the duration of the packet to the duration threshold and classify the packet as either a short or long packet. Controller 706 may then identify the channel on which the packet is scheduled to be transmitted and may identify the transmit chain (e.g., where wireless device 200 has multiple transmit chains) on which the packet is scheduled to be transmitted. Controller 706 may then use the short/long classification, channel, and transmit chain as the input parameters. Accordingly, controller 706 may identify the transmit power limit that is mapped to this set of input parameters in LUT 900. For example, if the packet is longer than the duration threshold and scheduled for transmission on channel 11 with transmit chain A, controller 706 may determine that this set of input parameters maps to a transmit power limit of 20 dBm. Controller 706 may therefore select 20 dBm as the transmit power limit in stage 804.

As previously indicated, channels may be subject to OOB and/or PSD emission restrictions. In some cases, the emission restrictions for certain channels may be dominated by either OOB or PSD emission restrictions. For example, channels near the edge of the WiFi band (e.g., ISM, U-NII, or other band), referred to herein as band-edge channels, may have transmit power limits that are primarily governed by OOB emission restrictions. Similarly, channels that are not near the edge of the WiFi band, referred to as non-band-edge channels, may have transmit power limits that are primarily governed by PSD emission restrictions. Accordingly, in some aspects, LUTs may map channels that are near the band edge to lower transmit power limits than other channels. For example, some WiFi channels may be located close to the edge of the band (e.g., the ISM, U-NII, or other band) and may therefore be more likely to leak onto adjacent bands (e.g., LTE bands). As packets transmitted on these channels may generate more OOB leakage, the LUT may therefore map lower transmit power limits to packets scheduled for transmission on these channels. LUT 900 shows an example of this, where packets scheduled for transmission on WiFi channels 1, 11, 12, and 13 are mapped to lower transmit power limits than other packets. As these WiFi channels are closest to the band edge, this may help to reduce OOB leakage. In some aspects, the channels closest to the band edge, such as WiFi channel 13, may be mapped to lower transmit power limits than channels farther from the band edge, such as WiFi channel 12.

Furthermore, as can be seen from the different transmit power limits in LUT 900, some LUTs may map higher transmit power limits to long packets than short packets. As previously discussed, the rationale for this is that long packets behave like narrowband signals and may therefore have less OOB leakage. For example, if the dominant emission restriction on channels 1, 11, 12, and 13 is an OOB emission restriction, longer packets may have less OOB leakage than shorter packets. Accordingly, LUT 900 may map higher transmit power limits to long packets than to short packets.

In contrast to channels 1, 11, 12, and 13 having dominant OOB emission restrictions, channels 2-10 in LUT 900 may not be band-edge channels. Consequently, channels 2-10 may not be as sensitive to OOB leakage limits as band-edge channels. As channels 2-10 may still be subject to PSD emission restrictions, the PSD emission restriction will be dominant for these channels. LUT 900 may therefore still provide a transmit power limit for channels 2-10 that is intended to keep the transmit power at or below the applicable PSD emission restrictions. As shown in FIG. 9, in LUT 900 all of channels 2-10 may have the same transmit power limit. This is exemplary, and in other aspects non-band-edge channels (or, e.g., any channels with dominant PSD or overall transmit power emission restrictions) may not all have the same transmit power limit.

While the above description FIG. 9 employs one duration threshold and two packet classifications, in some aspects controller 706 may alternatively use more than one duration threshold and more than two packet classifications. This is further detailed below regarding FIG. 11.

There are numerous similar LUT configurations that wireless device 200 may use to select transmit power limits for packets based on the durations of the wideband and narrowband sections. FIG. 10 shows exemplary LUT 1000 according to some aspects, which presents another example of a LUT for transmit power limit selection. In the example of FIG. 10, LUT 1000 may use channel, emission restriction type, and duration of wideband and narrowband sections as the input parameters mapped to transmit power limits. In other words, LUT 1000 may include a set of transmit power limits for OOB emission restrictions and a set of transmit power limits for PSD emission restrictions.

Accordingly, controller 706 may also determine the dominant emission restriction type before accessing LUT 1000. For example, if wireless device 200 is operating in a geographic region that is regulated according to a dominant OOB emission restriction (e.g., in the United States), controller 706 may identify OOB emission restriction as the emission restriction type. Conversely, if wireless device 200 is operating in a geographic region that is regulated according to a dominant PSD emission restriction (e.g., in Europe), controller 706 may identify PSD emission restriction as the emission restriction type. This information about the geographic region of operation may be available from an application layer of wireless device 200, which may provide the information to controller 706 for use in identifying the emission restriction type.

Continuing with the example of LUT 1000, LUT 1000 may use a classification system where different packets can be classified based on the relative duration of their wideband to narrowband sections. For example, LUT 1000 may use predefined ranges of wideband to narrowband duration, e.g., duration ranges 1-4. Controller 706 may therefore classify a given packet as one of duration ranges 1-4 based on the ratio of wideband to narrowband durations of the packet. For instance, duration range 1 may be a lowest range of ratios of wideband to narrowband duration (e.g., for packets with a narrowband section having a significantly longer duration than the wideband section), duration range 2 may be the second lowest range of ratios of wideband to narrowband duration (e.g., for packets with a narrowband section having a moderately longer duration than the wideband section), duration range 3 may be the third lowest range of ratios of wideband to narrowband duration (e.g., for packets with a wideband section having a moderately longer duration than the narrowband section), and duration range 4 may be the fourth lowest range of ratios of wideband to narrowband duration (e.g., for packets with a wideband section having significantly longer duration than the narrowband section). These duration ranges can be designed depending the particulars of the packet format. This usage of duration ranges can be applied to cases where the duration of either the wideband or narrowband section is fixed (e.g., in the case of fixed-duration wideband preambles in 802.11ax) or to cases where the durations of the wideband and narrowband sections are both variable. LUT 900 of FIG. 9 can also be considered as using duration ranges to classify packets based on their ratio of wideband to narrowband duration, where long packets have a higher ratio than short packets.

Accordingly, after controller 706 identifies a packet in stage 802, controller 706 may determine the ratio of narrowband to wideband duration of the packet. As the packet is scheduled for upcoming transmission, this information about the duration of the narrowband and wideband sections may be available to controller 706 prior to transmission. Controller 706 may therefore calculate the ratio of the wideband and narrowband durations and subsequently determine which of the predefined duration ranges the ratio fits in.

Controller 706 may then use this duration range, the emission restriction type, and the channel as the input parameters to select a transmit power limit from LUT 1000 in stage 804. For example, if the emission restriction type is an OOB emission restriction, the relative duration range is 3, and the packet is scheduled for transmission on channel 7, controller 706 may select a transmit power limit of 20 dBm for the packet. Controller 706 may similarly select other transmit power limits depending on the applicable input parameters for any given packet.

As previously indicated, there are numerous other input parameters that can be used in a LUT for transmit power limit selection. In addition to the duration of wideband and narrowband sections, emission restriction type, and channel, the input parameters can optionally also include number of subcarriers, transmission bandwidth, and/or number of antennas. For example, when the wideband or narrowband section has a large number of subcarriers and/or a large transmission bandwidth, the packet may produce more OOB leakage. The LUT may therefore map packets with larger number of subcarriers and/or larger transmission bandwidths to lower transmit power limits than packets with fewer numbers of subcarriers and/or smaller transmission bandwidths. Furthermore, some types of antennas and/or antenna arrays having larger number of antennas may produce more OOB leakage and/or PSD than other types of antennas and/or smaller antenna arrays. The LUT may therefore map packets scheduled for transmission on these types of antennas and/or larger antenna arrays to lower transmit power limits than other types of antennas and/or smaller antenna arrays. Various different LUTs can be formulated based on any number of these input parameters, where the LUT maps certain sets of input parameters to specific transmit power limits.

The examples of FIGS. 9 and 10 depict a single LUT. In some aspects, wireless device 200 may use multiple LUTs, and may select an appropriate LUT based on the operation parameters of wireless device 200. For example, as previously discussed some geographic areas may have dominant OOB emission restrictions while other geographic areas have dominant PSD emission restrictions. Accordingly, wireless device 200 may store multiple LUTs and may select one of the LUTs to use for transmit power limit selection based on the geographic area in which wireless device 200 is operating. In one example, wireless device 200 may store a first LUT that is designed for a first set of emission restrictions. This first set of emission restrictions is not limited to any specific emission restrictions, and can be primarily dominated by OOB emission restrictions or primarily dominated by PSD emission restrictions. The first LUT may therefore be uniquely suited for these specific emission restrictions. Wireless device 200 may also store a second LUT that is designed for a second set of emission restrictions. Like the first set of emission restrictions, the second set of emission restrictions is not limited to any specific emission restrictions and is referred to generally for purposes of explanation. Wireless device 200 may optionally store one or more additional LUTs that are similarly designed for different sets of emission restrictions. In some aspects, LUT 1000 can be considered two LUTs, where the dominant OOB emission restriction section is considered a first LUT and the dominant OOB PSD emission restriction section is considered a second LUT.

When wireless device 200 selects a transmit power limit in stage 804, controller 706 may select one of the LUTs to use for selecting the transmit power limit. In one example, different LUTs may be designed for the emission restrictions of specific geographic areas, such as where the first LUT is designed for US emission restrictions (e.g., OOB emission restriction dominant) and the second LUT is designed for European emission restrictions (e.g., PSD emission restriction dominant). Accordingly, controller 706 may first determine the geographic location of wireless device 200 and may then select the LUT that is designed for the emission restrictions of that geographic location. For example, controller 706 may select the first LUT if wireless device 200 is located in the US and may select the second LUT if wireless device 200 is located in Europe. As some locations are dominated by OOB emission restrictions while others are dominated by PSD emission restrictions, controller 706 may therefore select a LUT that is designed for the relevant type of emission restrictions. After selecting the LUT, controller 706 may select a transmit power limit based on the input parameters for the LUT. As discussed above, this can include at least one parameter that is based on the relative duration of the wideband section compared to the narrowband section of the packet. Accordingly, controller 706 may select a transmit power limit that depends on how the packet behaves in terms of wideband versus narrowband. As a result, controller 706 may select transmit power limits that are better suited to the behavior of the packet.

Furthermore, in some cases the LUTs may be designed so that multiple LUTs are relevant to a particular scenario. For example, both the first LUT and the second LUT may be relevant to the scenario in which wireless device 200 is operating. In this case, controller 706 may select a first transmit power limit from a first LUT and select a second transmit power limit from a second LUT. Controller 706 may then select the minimum of the first and second transmit power limits to use as the transmit power limit.

In some aspects, controller 706 may store the LUT in a one-time programmable memory (OTP) or other type of non-volatile memory. The memory may be part of controller 706 or may be located external to controller 706. In some aspects, the LUT and/or the control logic used by controller 706 may be stored in wireless device 200 as firmware.

In some aspects, controller 706 may determine the transmit power limit in stage 804 by calculating the transmit power limit based on the input parameters. For example, whereas a LUT such as LUTs 900 and 1000 maps the input parameters to transmit power limits, controller 706 may alternatively utilize a transmit power limit equation that calculates a transmit power limit from the input parameters. Similar to the LUTs, these equations can be defined in various different manners using various different input parameters, and may follow the same general relationships as the LUTs. For example, a transmit power limit equation for calculating a transmit power limit for dominant OOB emission restrictions (e.g., in the US) may output higher transmit power limits for packets that have lower relative durations of wideband to narrowband durations. Conversely, a transmit power limit equation for calculating a transmit power limit for dominant PSD emission restrictions (e.g., in Europe) may output higher transmit power limits for packets that have higher relative durations of wideband to narrowband durations. The other input parameters may affect the outputs of the transmit power limit equation in a similar manner (e.g., yielding higher or lower transmit power limit outputs) as described above for LUTs.

Accordingly, there are various different mechanisms by which controller 706 may select the transmit power limit in stage 804. Regardless of the specific mechanism used, in various aspects controller 706 may select the transmit power limit based on the durations of the wideband and narrowband sections of the packet. Selection of the transmit power limit may generally follow the relationships between duration of the wideband and narrowband sections described above. In particular, for channels that are dominated by OOB emission restrictions controller 706 may select a higher transmit power limit for packets that have lower relative duration of wideband to narrowband sections than packets that have higher relative duration of wideband to narrowband sections. For channels that are dominated by PSD emission restrictions, controller 706 may select a higher transmit power limit for packets that have higher relative duration of wideband to narrowband sections than packets that have lower relative duration of wideband to narrowband sections.

After selecting the transmit power limit for the packet in stage 804, wireless device 200 may proceed to stage 806 to select a transmit power value for the packet based on the transmit power limit. For example, in stage 806 controller 706 may first determine a preliminary transmit power value based on the packet (e.g., ignoring the emission restrictions and the transmit power limit). In various aspects, controller 706 may determine the preliminary transmit power value based on parameters such as modulation and coding scheme (MCS) or other parameters that impact transmission power. Controller 706 may then clip the preliminary transmit power value with the transmit power limit to obtain the transmit power value for transmitting the packet. For example, controller 706 may, if the preliminary transmit power value is greater than the transmit power limit, reduce the preliminary transmit power value to the transmit power limit and use this reduced transmit power value as the transmit power value for transmitting the packet.

After selecting the transmit power value in stage 806, wireless device 200 may transmit the packet with a transmit power indicated by the transmit power value in stage 808. For example, controller 706 may provide the transmit power value to transmitter 704, which may then transmit the packet with a transmit power according to the transmit power value. For instance, controller 706 may control transmitter 704 to transmit the packet with a transmit power equal to the transmit power value. Transmitter 704 may then, for example, amplify and transmit the packet via antenna system 702 with the transmit power.

As controller 706 selected the transmit power limit based on the relative durations of the wideband section to the narrowband section, wireless device 200 may transmit the packet with a transmit power appropriate for the applicable emission restriction. This may provide various advantages in terms of communication performance and/or regulatory compliance. For example, because controller 706 considers the relative duration of the wideband and narrowband sections, controller 706 may make a transmit power limit selection based on whether the packet will behave more like a wideband packet or a narrowband packet (e.g., based on whether the wideband or narrowband behavior is dominant). Accordingly, as the transmit power limit selection may be tailored to how the packet behaves, controller 706 may be able to select high transmit power limits that still comply with the applicable emission restrictions. Compared to other cases where a wireless device is too aggressive (e.g., selects a transmit power limit that is too high to comply with the emission restrictions) or too conservative (e.g., selects a transmit power limit that is considerably lower than that needed to comply with the emission restrictions), wireless device 200 may select transmit power limits that are closer to but still below a maximum allowable transmit power limit for a given emission restriction. Wireless device 200 may consequently be able to achieve better performance. For example, as wireless device 200 may be able to use higher transmit power limits, wireless device 200 may experience improved range, better connectivity, and/or fewer dropped calls and data sessions.

In some aspects, wireless device 200 may be configured to repeat method 800, such as by performing method 800 to select a transmit power limit and corresponding transmit power value for multiple packets in the sequence of scheduled packets. Accordingly, controller 706 may be configured to identify multiple (or each) packets in the sequence of scheduled packets, select a transmit power limit based on the durations of the wideband and narrowband sections, select a transmit power value based on the transmit power limit, and then control transmitter 704 to transmit the packet via antenna system 702 with a transmit power indicated by the transmit power value. As the packets may have different durations of the wideband and narrowband sections, transmitter 704 may transmit various packets with different transmit power limits. For example, a first packet may have a longer relative duration of wideband to narrowband sections than a second packet and may have the same input parameters as the second packet. The first packet may therefore have a dominant wideband section (e.g., its spectrum may more resemble a wideband signal) while the second packet may have a dominant narrowband section (e.g., its spectrum may more resemble a narrowband signal). Accordingly, in an exemplary case with an OOB emission restriction, controller 706 may select a lower transmit power limit for the first packet than the second packet. In an exemplary case with a PSD emission restriction, controller 706 may select a higher transmit power limit for the first packet than the second packet.

Various other modifications to these transmit power limit selection techniques are also within the scope of this disclosure. For example, some aspects above utilized a duration threshold to classify packets as short or long packets. In some aspects, controller 706 may utilize different duration thresholds for different types of packets. For example, controller 706 may use a first duration threshold to classify packets of a first bandwidth and may use a second duration threshold to classify packets of a second bandwidth. Controller 706 may then use this packet classification as one of the input parameters in the LUT. In one example for 802.11ax packets, the first duration threshold may be 100 us for 20 MHz packets while the second duration threshold may be 50 us for 2 MHz packets. In various aspects, the duration thresholds may be set in terms of time (e.g., us), number of symbols (e.g., OFDM symbols), and/or number of bytes.

In some aspects, controller 706 may use different packet duration thresholds for different channels and/or resource units (RUs). For example, controller 706 may use a first duration threshold for a first set of channels and/or RUs and may use a second duration threshold for a second set of channels. In one example using WiFi, controller 706 may use a first packet duration threshold for channels 1, 11, 12, and 13 in the 2.4 GHz band and may use a second packet duration threshold for channels 2-10. In this example, controller 706 may use a first packet duration threshold for band-edge channels (e.g., channels 1, 11, 12, and 13) and a second packet duration threshold for other channels (e.g., channels 2-10).

In some aspects, controller 706 may utilize a LUT to select a transmit power limit for packets scheduled for transmission on a subset of the overall set of channels. Accordingly, controller 706 may only apply the LUT to select transmit power limits for certain packets, namely those scheduled for transmission on certain channels.

In some aspects, a LUT for transmit power limit selection may be expressed in terms of the actual transmit power limit. In other aspects, a LUT for transmit power limit selection may be expressed in terms of a difference with respect to a reference value. In one example, the reference value can be the transmit power limit for a particular entry in the LUT. For example, with reference to FIG. 9, the transmit power limits for WiFi channels 2-13 may be expressed as a difference relative to the transmit power limit for WiFi channel 1. This may help conserve memory space as the difference values may constitute fewer bits than the full transmit power limit.

In some aspects, wireless device 200 may use a single LUT for selecting transmit power limits of multiple types of packets. For example, in some cases wireless device 200 may be configured to transmit both wideband packets (e.g., legacy 802.11 packets) as well as packets having varying bandwidth (e.g., both a wideband and narrowband section). Because packets with varying bandwidth that have short duration can behave like wideband packets, one LUT can be used to select transmit power limits for both the wideband packets and the varying bandwidth packets. For example, one or more columns of the LUT that map transmit power limits to short varying bandwidth packets can also be used to select transmit power limits for wideband packets. In some cases, this may reduce memory usage.

In some aspects, wireless device 200 may decide whether to transmit pending data as either long or short packets based on the emission restrictions that govern its location. For example, aspects described above reference the 802.11ax standard where there is a wideband preamble of fixed-duration and a narrowband data section of variable duration. Longer packets will therefore be those that have longer narrowband data sections and consequently carry more data. Furthermore, because longer packets have longer narrowband data sections (relative to the fixed-duration wideband section), they will behave more like narrowband signals. Controller 706 may therefore decide whether to allocate pending data into long packets or into short packets depending on the applicable emission restrictions in its current location.

For example, controller 706 may first determine the location of wireless device 200, such as whether wireless device 200 is in a geographic area with emission restrictions dominated by OOB emission restrictions (e.g., in the US) or in a geographic area with emission restrictions dominated by PSD emission restrictions (e.g., in Europe). If wireless device 200 is in an OOB-dominated area, controller 706 may decide to allocate the pending data into longer packets. As the packets are longer and will behave in a narrowband manner, wireless device 200 may be able to transmit the packets with a higher transmit power limit (compared to shorter packets) and still comply with the OOB-dominant emission restrictions. The LUT, which is based on the OOB-dominant emission restrictions of the geographic area, will therefore allocate higher transmit powers to these longer packets than compared to shorter packets. This higher transmission power can in turn lead to improve performance.

Similarly, if wireless device 200 is in a PSD-dominated area, controller 706 may decide to allocate the pending data into shorter packets. As the packets are shorter and will behave in a wideband manner, wireless device 200 may be able to transmit the packets with a higher transmit power limit (compared to longer packets) and still comply with the PSD-dominant emission restrictions. The LUT, which is based on the PSD-dominant emission restrictions of the geographic area, will therefore allocate higher transmit powers to these shorter packets than compared to longer packets.

In various aspects, a LUT may be characterized as a predefined mapping that maps certain sets of input parameters (e.g., combinations of input parameters) to certain transmit power limits. As previously described above, for emission restrictions dominated by OOB emission restrictions these predefined mappings may generally map packets with longer relative durations of wideband to narrowband sections to lower transmit power limits. For emission restrictions dominated by PSD emission restrictions, these predefined mappings may generally map packets with longer relative durations of wideband to narrowband sections to higher transmit power limits.

Figure 11:
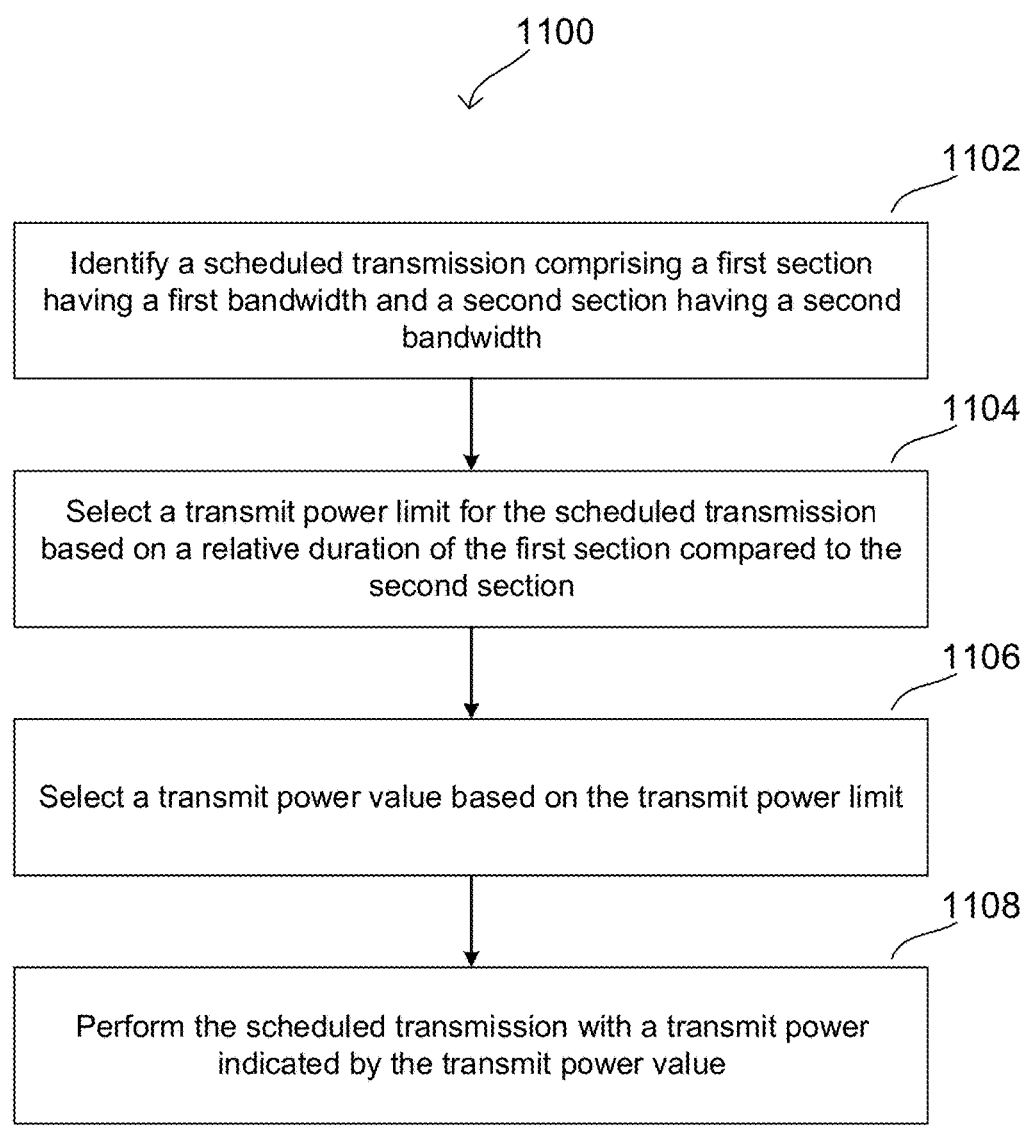
FIG. 11 shows a first exemplary method for performing wireless communications at a wireless device according to some aspects.

FIG. 11 shows exemplary method 1100 of performing wireless communications at a wireless device according to some aspects. As shown in FIG. 11, method 1100 includes identifying a scheduled transmission including a first section having a first bandwidth and a second section having a second bandwidth (1102), selecting a transmit power limit for the scheduled transmission based on a relative duration of the first section compared to the second section (1104), selecting a transmit power value based on the transmit power limit (1106), and performing the scheduled transmission with a transmit power indicated by the transmit power value (1108).

Figure 12:
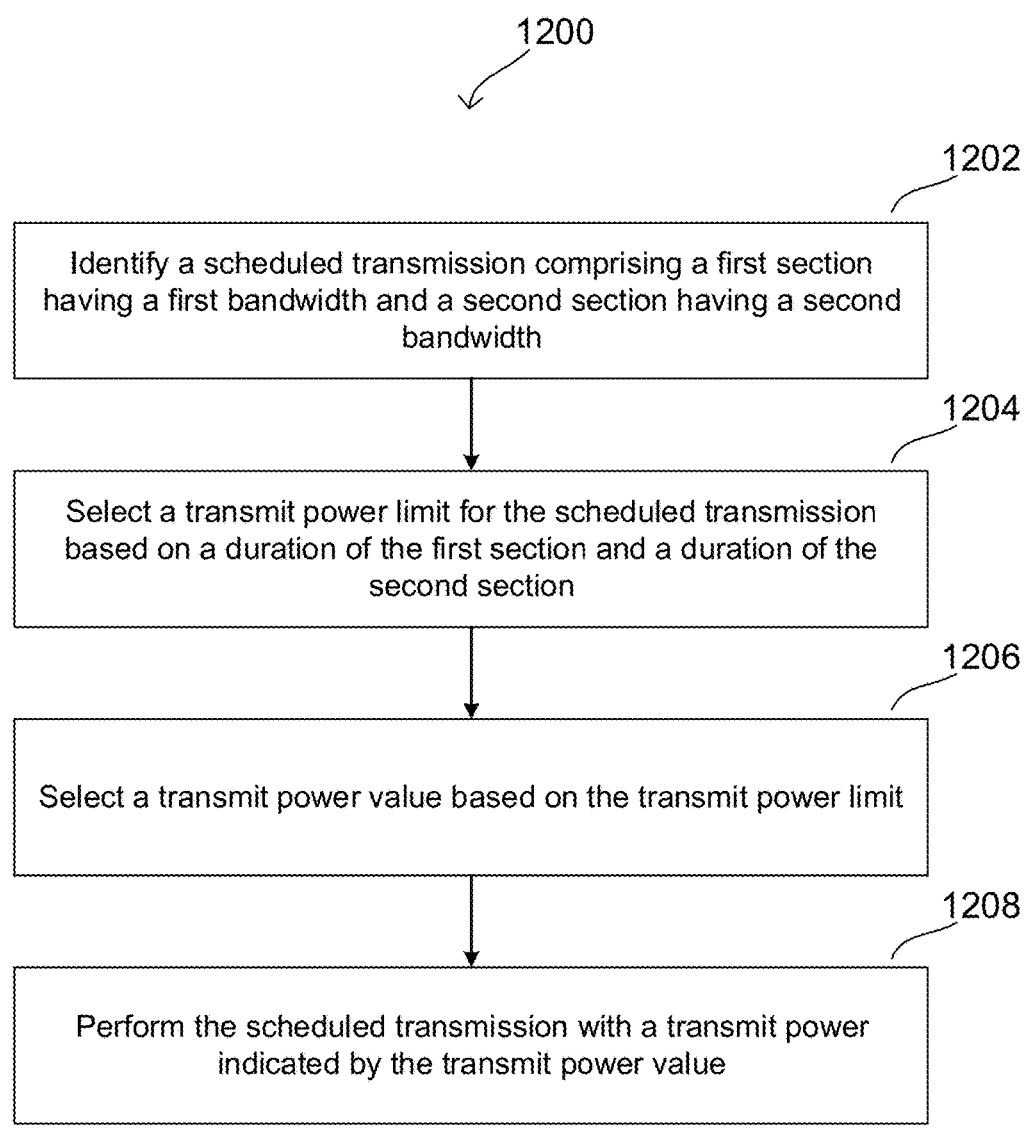
FIG. 12 shows a second exemplary method for performing wireless communications at a wireless device according to some aspects.

FIG. 12 shows exemplary method 1200 of performing wireless communications at a wireless device according to some aspects. As shown in FIG. 12, method 1200 includes identifying a scheduled transmission including a first section having a first bandwidth and a second section having a second bandwidth (1202), selecting a transmit power limit for the scheduled transmission based on a duration of the first section and a duration of the second section (1204), selecting a transmit power value based on the transmit power limit (1206), and performing the scheduled transmission with a transmit power indicated by the transmit power value (1208).

Figure 13:
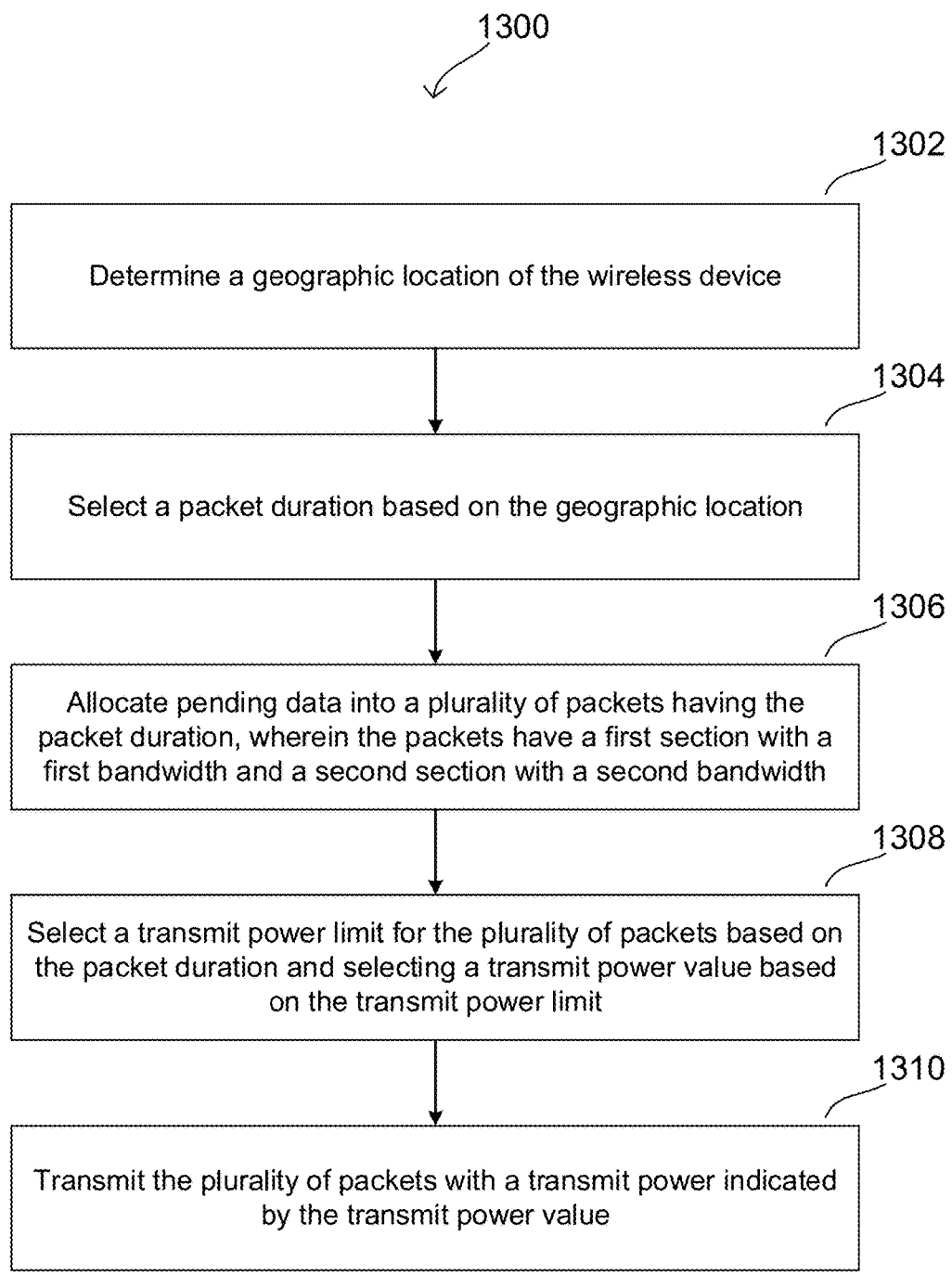
FIG. 13 shows a third exemplary method for performing wireless communications at a wireless device according to some aspects.

FIG. 1300 shows exemplary method 1300 of performing wireless communications at a wireless device. As shown in FIG. 13, method 1300 includes determining a geographic location of the wireless device (1302), selecting a packet duration based on the geographic location (1304), allocating pending data into a plurality of packets having the packet duration (1306), wherein the packets have a first section with a first bandwidth and a second section with a second bandwidth, selecting a transmit power limit for the plurality of packets based on the packet duration (1308), and selecting a transmit power value based on the transmit power limit, and transmitting the plurality of packets with a transmit power indicated by the transmit power value (1310).

In some aspects, wireless device 200 can be characterized as including a controller (e.g., controller 706) configured to identify a scheduled transmission including a first section having a first bandwidth and a second section having a second bandwidth, select a transmit power limit for the scheduled transmission based on a relative duration of the first section compared to the second section, and select a transmit power value based on the transmit power limit, and a transmitter (e.g., transmitter 704) configured to perform the scheduled transmission with a transmit power indicated by the transmit power value. In some aspects, wireless device 200 can alternatively be characterized as including one or more processors (e.g., controller 706) configured to identify a scheduled transmission including a first section having a first bandwidth and a second section having a second bandwidth, select a transmit power limit for the scheduled transmission based on a relative duration of the first section compared to the second section, select a transmit power value based on the transmit power limit, and control a transmitter to perform the scheduled transmission with a transmit power indicated by the transmit power value.

In some aspects, wireless device 200 can be characterized as a wireless device wireless device including a controller (e.g., controller 706) configured to determine a geographic location of the wireless device, select a packet duration based on the geographic location, allocate pending data into a plurality of packets having the packet duration, wherein the packets have a first section with a first bandwidth and a second section with a second bandwidth, and select a transmit power limit for the plurality of packets based on the packet duration and selecting a transmit power value based on the transmit power limit, the wireless device further including a transmitter (e.g., transmitter 704) configured to transmit the plurality of packets with a transmit power indicated by the transmit power value. In some aspects, wireless device 200 can alternatively be characterized as a wireless device including one or more processors (e.g., controller 706) configured to determine a geographic location of the wireless device, select a packet duration based on the geographic location, allocate pending data into a plurality of packets having the packet duration, wherein the packets have a first section with a first bandwidth and a second section with a second bandwidth, select a transmit power limit for the plurality of packets based on the packet duration and selecting a transmit power value based on the transmit power limit, and control a transmitter to transmit the plurality of packets with a transmit power indicated by the transmit power value.

Various aspects described above utilize different parameters related to duration to access the LUT and to select transmit power limits from the LUT. For example, various aspects may use a total duration of the packet, a relative duration of the wideband section compared to the narrowband section, or a ratio of the duration of the wideband section to the narrowband section. These parameters can be generally characterized as duration parameters, where controller 706 may select a transmit power limit from the LUT based on a particular duration parameter.

Wireless products, including but not limited to Wi-Fi products, include tables of transmit power limitations to comply with various certification and regulatory requirements. Regulatory requirements are set by countries' wireless regulators and limit various communications parameters. Of particular note, countries may have regulations that limit "band-edge," power spectral density, or both. Even where band-edge and power spectral density are both regulated, the regulation in a given country may be more onerous for one of these aspects than for the other.

For example, and with respect to Wi-Fi bands of 2.4 GHz or 5 GHz, the United States limits out-of-band emission, such as the amount of power emitted by Wi-Fi transmitters not exceeding −41.2 Bm/MHz Effective Isotropic Radiated Power ("EIRP") on band-edge frequencies adjacent to the Wi-Fi bands. Although the United States may also regulate the power within each Wi-Fi channel, known as power spectral density, the band-edge limitation in the United States may be more onerous compared to the United States' limitation on power spectral density. Although these examples correspond to current relevant Wi-Fi bands, it is expressly contemplated that other Wi-Fi bands may become relevant in the future. The concepts disclosed herein can be applied to other bands as becomes relevant and are not intended to be limiting The European Union, on the other hand, may have a more onerous limit on power spectral density than the United States. For example, the relevant European limit on power spectral density may be 10 dBm per MHz for 2.4 GHz or 5 GHz implementations. It is expressly contemplated that other bands may be relevant in the future, and the concepts disclosed herein may be adapted for bands in future use. Nothing in this application is intended to be limiting to currently used bands.

Whatever the regulatory limit, legacy wireless systems have managed their transmission to meet band-edge or power spectral density regulations by limiting their transmission power. This has been achieved by storing either the limit itself or a corresponding setting designed to ensure compliance with the regulatory limit in a non-volatile memory. Devices access the stored data in this memory to ensure that transmit power does not exceed the stored limitation, thereby ensuring regulatory compliance.

Historically speaking, monotonicity of performance has been assumed in Wi-Fi communications. In other words, if a high transmit power for a packet conforms to a given regulation, then a reduced transmit power will also conform to the regulation. As such, many products simply comprise a table of maximum values, which are values that limit the maximum transmission power. Typically, after a product is developed, it is tested and certified in official labs, which determine corresponding transmit power limitations for compliance with regulations. These limits are then stored in non-volatile memory. Generally a single maximum transmit power limit is stored for a given bandwidth. For example, if there is a 20 MHz packet, a single maximum transmit power corresponding to 20 MHz is stored in the non-volatile memory.

This has worked satisfactorily where the packet preamble and payload have been the same bandwidth, since, in such a system, the functional combined bandwidth has been the same as the bandwidth of either the preamble or the payload.

It is anticipated, however, that one or more wireless transmission standards will be updated to include a change to the packet configuration, such that packets will comprise a comparatively wideband preamble and a comparatively narrowband data payload. For example, IEEE 802.11ax is expected to introduce a new type of packet to Wi-Fi, which includes orthogonal frequency-division multiple access ("OFDMA") triggered uplink packets, having a relatively wideband legacy preamble, followed by a new 11ax narrowband data transmission. The discrepancy between the preamble bandwidth and the data bandwidth of the transmission is novel in Wi-Fi, for example. Furthermore, although the preamble may be of a fixed duration, in some instances approximately 40 usec, the data payload is of a variable duration, wherein the duration is dependent on, and directly proportional to, the size or amount of data to transmit. Although it has been endeavored to use packet "size" for consistency in this disclosure, the principles discussed herein generally understand a relationship between packet size and packet duration, and it is understood that references to duration are generally intended to address the principles discussed herein relative to size.

Under 802.11ax, the packet comprises a preamble that must be 20 MHz or larger, which is so arranged to comply with legacy devices. The preamble is followed by an 802.11ax data transmission (or data payload), which can be narrowband. For example, although the preamble may have been 20 MHz, it is now possible to have a variety of bandwidths for data payload, including, but not limited to, 2 MHz, 4 MHz, or 8 MHz. This potential combination of a wideband preamble and a narrowband packet affects the format of the observed signal. When such packets are transmitted, this results in a perceived superimposition of the wideband and narrowband portions during measurement, which may affect regulatory compliance.

Any disparity in bandwidth between the preamble and the data payload has potential implications for the emission spectrum. For this point, it is helpful to understand the emission spectrum as a function of bandwidth. When addressing a packet made of a non-overlapping concatenation of a wideband and a narrowband signal, the observed spectrum is influenced by both the lengths of the wideband signal and the narrowband signal. It is anticipated that the length of the wideband preamble is fixed, and therefore, in instances where the payload's bandwidth is narrower than the preamble's bandwidth, the length of the data payload becomes a significant variable in determining the emission spectrum. This is largely due to the process for spectrum observation, which relies on free-running or averaging operations of the signal at the equipment. Because of this procedure, the observed spectrum is influenced by both the wideband and narrowband parts.

In the case of a signal with a comparatively wideband preamble and a comparatively narrow data payload, the proportion of the wideband signal to the narrowband signal greatly determines the signal emission. Thus, where the preamble is a fixed duration, the length or size of the data payload largely determines the signal emission. A packet with a fixed-length wideband preamble and a short narrowband data payload will be similar to a wideband signal, and a packet with a fixed-length wideband preamble and a long narrowband data payload will be similar to a narrowband signal.

The resulting signal has implications for band-edge and power spectral density. Generally speaking, the wider the signal bandwidth, the wider the undesired emission outside of the channel or mask. This is based on the third order intermodulations, which range farther for a wider bandwidth signal than for a narrowband signal. Thus, a wider bandwidth signal may not conform to a band-edge regulation, even where its power is the same as the narrow-bandwidth signal that was regulatory-compliant. Otherwise stated, where a narrow-bandwidth signal at a given transmit power complies with a band-edge regulation, a wider bandwidth signal at the same transmit power may not comply with the band-edge regulation. With respect to power spectrum density, where a wide-bandwidth signal at a given transmit power complies with a power spectrum density regulation, a narrow-bandwidth signal at the same power may no longer comply.

In light of the foregoing, and given a fixed duration preamble, the size of a packet payload may be a primary factor in determining a packet's functional bandwidth. Because the functional bandwidth can change from packet to packet based on the varying payload length, use of a single maximum transmit power becomes inefficient. Were a single maximum transmit power used to maintain compliance with the relevant regulation, this the single maximum transmit power would have to be calculated for a worst-case situation. More concretely, to comply with band-edge regulations, a single maximum transmit power would have to be chosen to account for a very small data payload size, where the observed single will be functionally wideband and thus more likely to exceed an allowable signal amount outside of the bandwidth and thus violate the band-edge regulation. Similarly, to comply with power spectral density regulations, a single maximum transmit power would have to be chosen to account for a very long payload, where the observed signal will be functionally narrowband and therefore more likely to exceed a power spectral density threshold.

Because the payload size is expected to be variable between packets, not every packet will be a worst-case scenario. Some packets are likely to be long, and thereby create a narrowband transmission that will more easily comply with band-edge regulations. Some packets are likely to be short, and thereby create a wideband transmission that will more easily comply with power spectral density regulations. This size variation of a payload as a different bandwidth from the preamble makes a single transmit power limitation inefficient.

Thus, the variable packet size presents an opportunity to tailor the transmission power. Specifically, where band-edge is at issue, transmission power can be increased for long data payloads relative to short data payloads. Similarly, where power spectral density is at issue, transmission power can be increased for short data payloads relative to long data payloads. Stronger signals result in increased signal range or penetration, which can result in better signal reach within a home or building, and can generally increase user satisfaction. Where the received signal is sufficiently strong, increased transmit power may also result in a higher throughput. Where the transmit power can be increased while assuring compliance with the regulations, it may thus be desirable to increase the transmit power, as increased transmit power is closely associated with better signal strength, increase wireless coverage, and overall user satisfaction.

Figure 14:
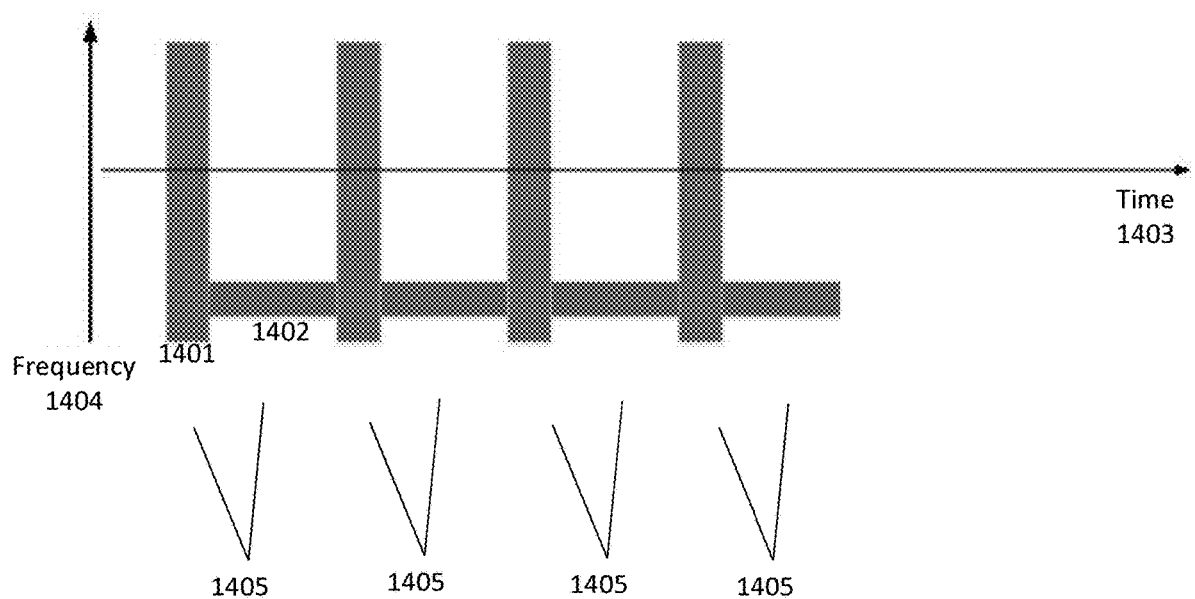
FIG. 14 shows a transmission of a wideband preamble with a comparatively narrowband data payload bandwidth.

FIG. 14 shows a transmission of four packets comprising a wideband preamble and a narrowband data payload. The preamble 1401 is represented by the vertical rectangles, which are displayed as being wide in frequency and narrow in time. The data payload 1402 is represented by the horizontal rectangles, which are displayed as being narrow in frequency and wide in time. The x-axis 1403 displays time, and the y-axis 1404 displays frequency. The combination of a single preamble 1401 and its following data payload 1402 forms a packet 1405. In this figure, four packets 1405 are transmitted. The preambles 1401 have a standardized length and are therefore depicted as being the same size. Although, the payloads 1402 may vary in size, they are depicted here as being the same size for simplicity.

Figure 15:
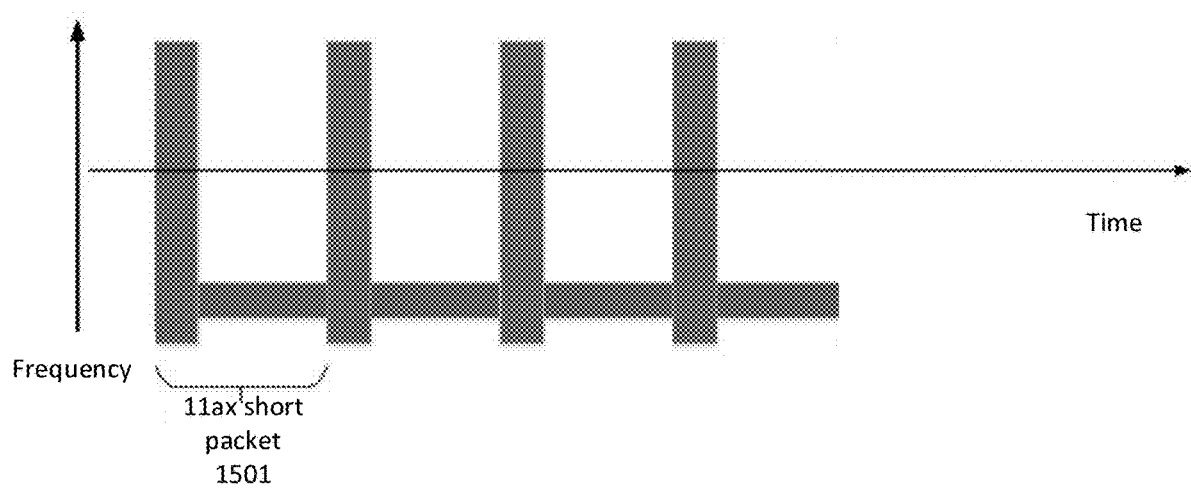
FIG. 15 shows a time frequency response of a wideband preamble with a comparatively short narrowband data payload.
Figure 16:
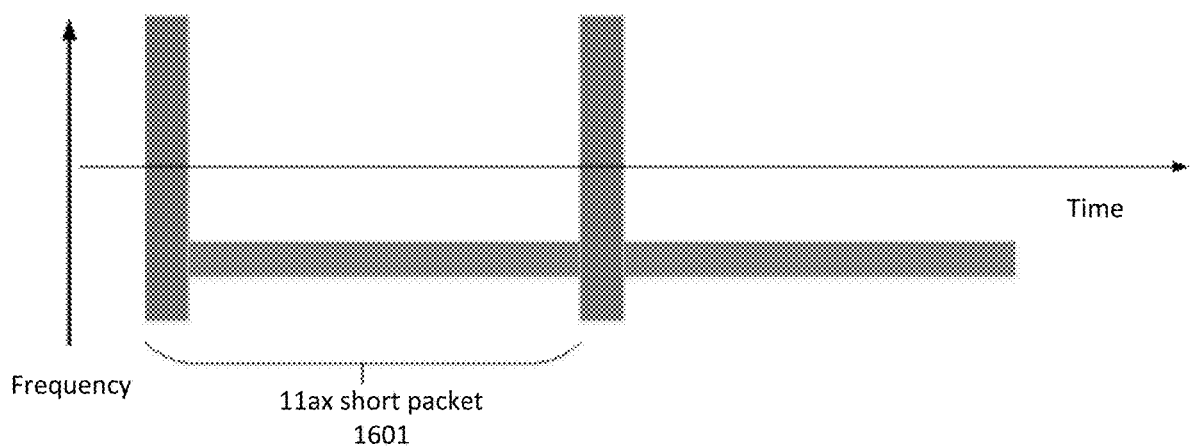
FIG. 16 shows a time frequency response of a wideband preamble with a comparatively long narrowband data payload.

FIGS. 15 and 16 show a juxtaposition of packet 1405 transmissions with either short data payloads 1501 or long data payloads 1601. Although these systems are shown with homogeneously long or homogeneously short payloads, it is expressly anticipated that various payload sizes may be intermixed, such that the length of one payload may differ from the length of the proceeding or following payload.

Figure 17:
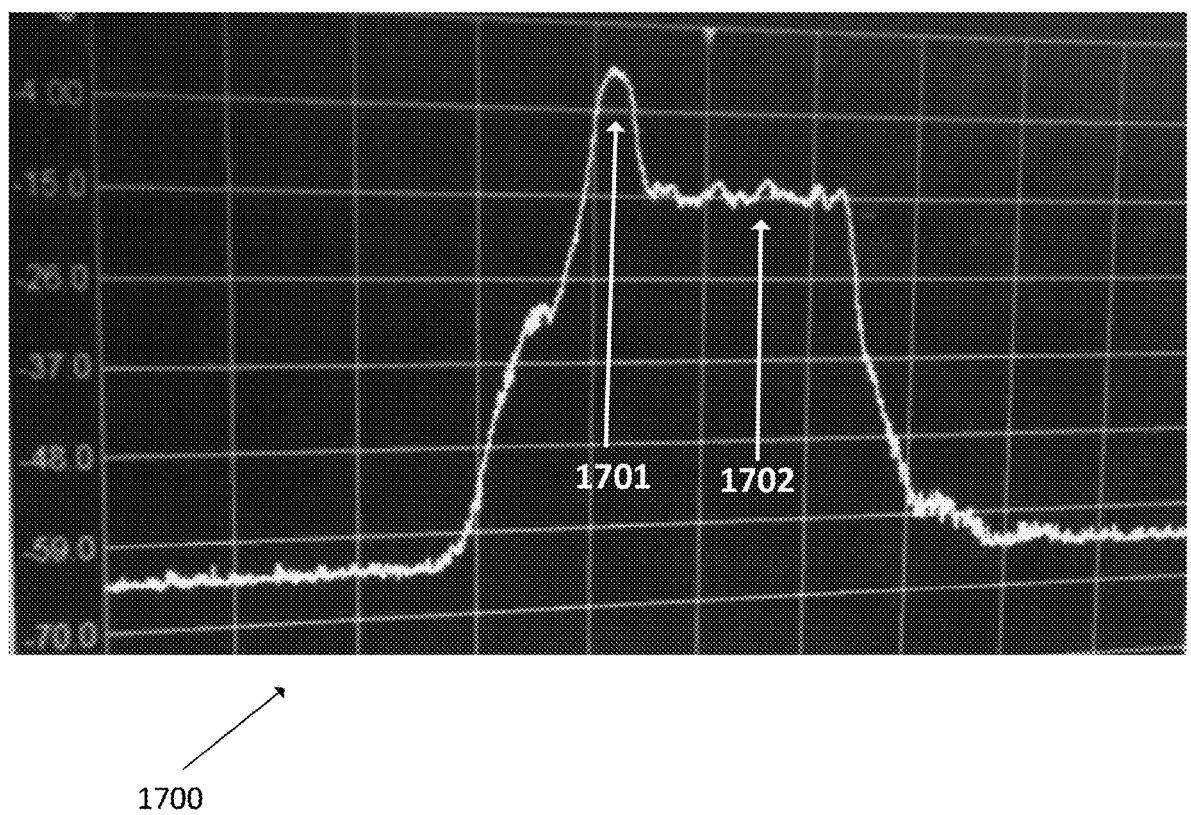
FIG. 17 shows a combined spectrum of a wideband and a narrowband transmission.

FIG. 17 shows a combined spectrum image 1700 of a wideband and a narrowband transmission. The combined spectrum image 1700 corresponds to packet configuration such as the packet configuration shown in FIG. 16, wherein the packet comprises a short, comparatively wideband signal, along with a long, comparatively narrowband data payload. In this case, the narrowband payload is depicted as a finger-shaped hill 1701, and the wideband preamble signal is depicted as a wide ridge 1702. According to this image, and where the signal comprises a fixed-length, wideband preamble and a variable-length, narrowband payload, the specific length of the payload greatly influences the makeup of any individual combined spectrum image under the new standard. A packet with a short or small narrowband payload will exhibit decreased time between large headers and therefore will function much like a wideband signal. Conversely, a packet with a comparatively large narrowband payload will exhibit increased time between large headers and therefore will function much like a narrowband signal. The descent may show intermodulations. In general, FIG. 4 is a visual depiction of a frequency response, which is a combined spectrum.

Figure 18:
FIG. 18 shows an effect of intermodulation on a signal.

FIG. 18 shows intermodulation in a transmitted signal. Intermodulation generally results from the interaction of two or more signals at different frequencies passing through a non-linear system. The resulting intermodulation produces a signal in adjacent frequency bandwidths. For example, in FIG. 18, an original signal 1801 is transmitted in a wireless communication network. Generally, it is expected that the intermodulation will predominate in the area of one bandwidth to the left and the right of the transmission bandwidth. Because non-linearities with other transmitted signals, intermodulation results in a signal to the left of the frequency spectrum 1802 from the original signal 1801 and a signal to the right of the frequency spectrum 1803 from the original signal 1801. For example, in a transmission of 20 MHz bandwidth, the resulting intermodulation will be expected to range for 20 MHz to the left of the signal and 20 MHz to the right of the signal, such that the combined signal and areas of intermodulation total 60 MHz. Intermodulations of the $3^{rd}$ order are generally the most dominant and most impact the regulatory limits. Although higher order intermodulations (such as $5^{th}$ order or $7^{th}$ order intermodulations) can occupy even larger bandwidth, their power is lower than those of $3^{rd}$ order intermodulations and therefore tend to be less relevant to the regulatory limits than the $3^{rd}$ order intermodulations.

Figure 19:
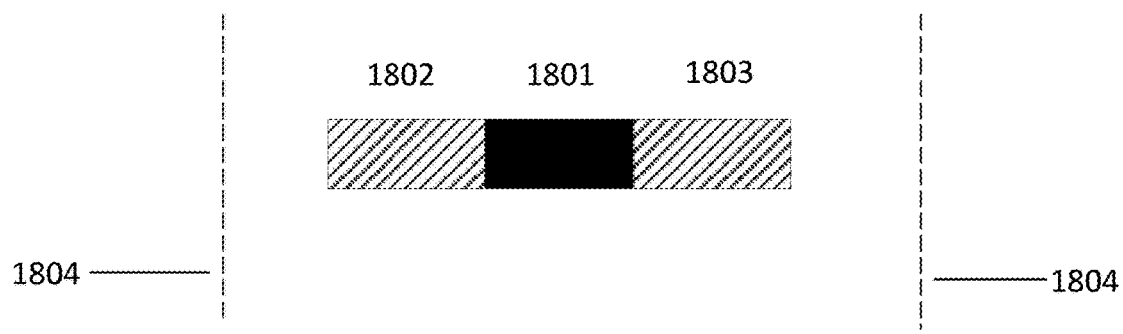
FIG. 19 shows a narrowband signal with intermodulation in relation to a band-edge regulation.
Figure 20:
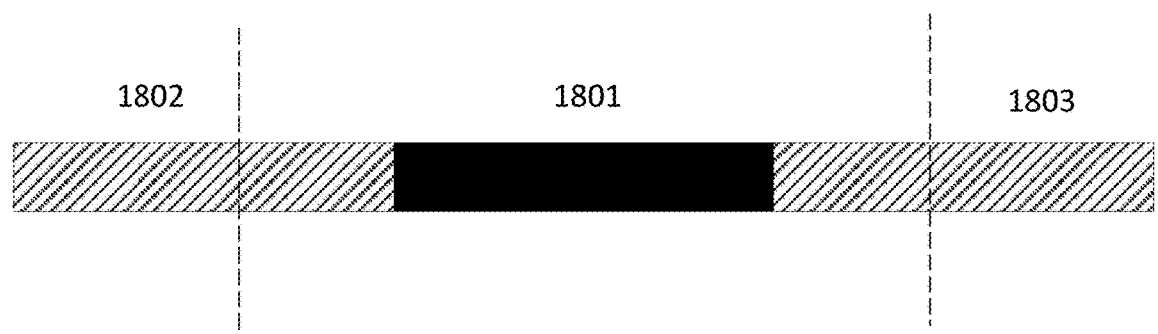
FIG. 20 shows a wideband signal with intermodulation in relation to a band-edge regulation.

FIG. 19 shows a relationship between a narrowband signal with intermodulation and a band edge. In this case, the original signal 1801 is a comparatively narrowband signal. The resulting intermodulation is closely related to the bandwidth of the original signal, and therefore the intermodulation of this narrowband signal is also likely to be comparatively narrow. This results in an intermodulation to the left 1802 of the intermodulation, and an intermodulation to the right 1803 of the original signal 1801, both intermodulations being comparatively narrowband. Where a band-edge is specified 1804, outside of which signal or intermodulation is undesirable, a narrowband signal with intermodulation is less likely to transmit outside of the band-edge. In contrast, as shown in FIG. 20, where an original signal 1801 is comparatively broadband, the resulting intermodulation on the left 1802 and the right 1803 may be rather broad and thus create a greater likelihood of exceeding the band-edge.

Figure 21:
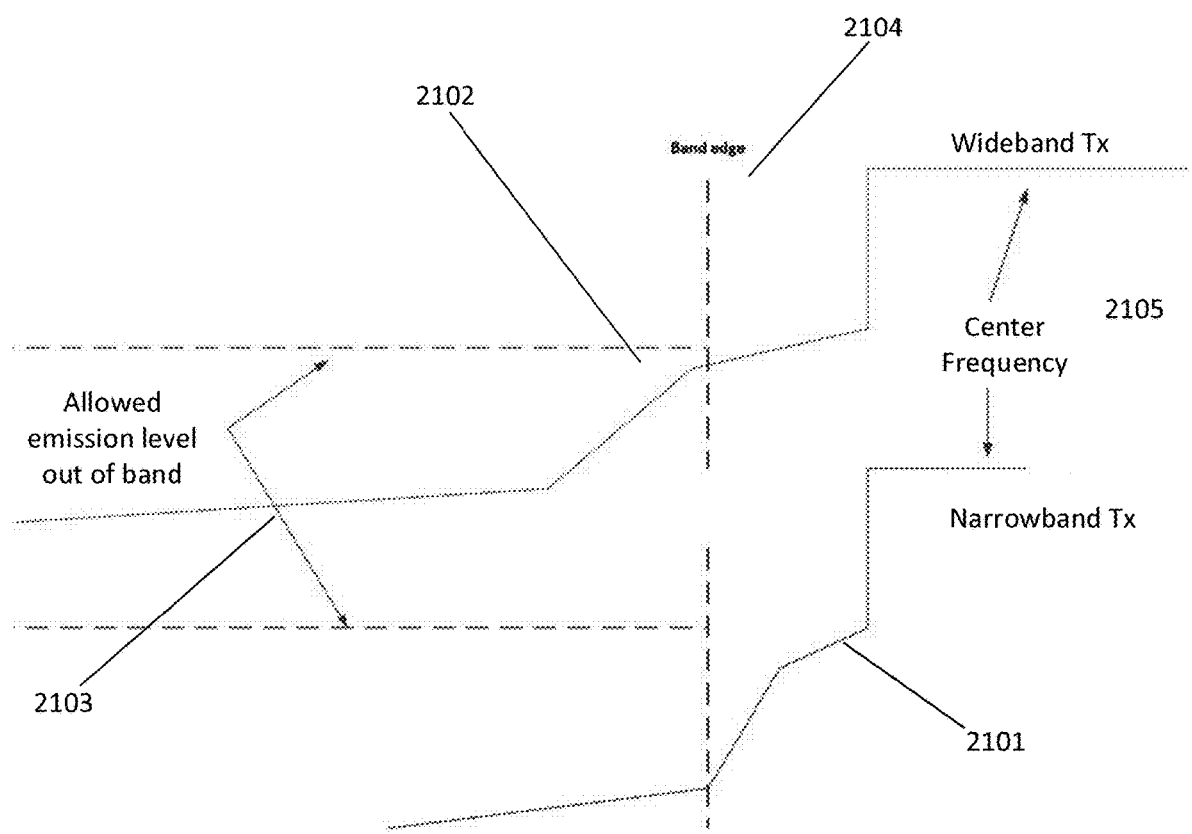
FIG. 21 shows an emission spectrum as a function of bandwidth.

FIG. 21 shows an illustration of an emission spectrum. In FIG. 21, the emission spectrum of a functionally narrowband transmission is depicted as 2101. The emission spectrum of a non-concurrent wideband transmission is depicted as 2102. The allowable emission level outside of the band 2103 is shown by horizontal dotted lines. It is assumed herein that the narrowband transmission 2101 and the wideband transmission 2102 do not have a mix of bandwidths inside their packets. Both the narrowband transmission 2101 and the wideband transmission 2102 have their own center frequencies, such that the signal edges for the narrowband transmission 2101 and the wideband transmission 2102 occur on the same frequency. The band-edge 2104 is shown by vertical dotted lines. The center frequency 2105 of the wideband and the narrowband packets are shown. This figure demonstrates that the wider the signal bandwidth, the wider the undesired emission outside of the channel becomes. Thus, where there is an absolute limitation for out-of-band emission, such as in a regulation, transmission power becomes especially relevant for wider bandwidth signals. Due to third order intermodulations, wider bandwidths may not conform to a band-edge regulation when transmitted with the same transmit power used for a comparatively narrow-bandwidth transmission that was regulation-compliant.

Figure 22:
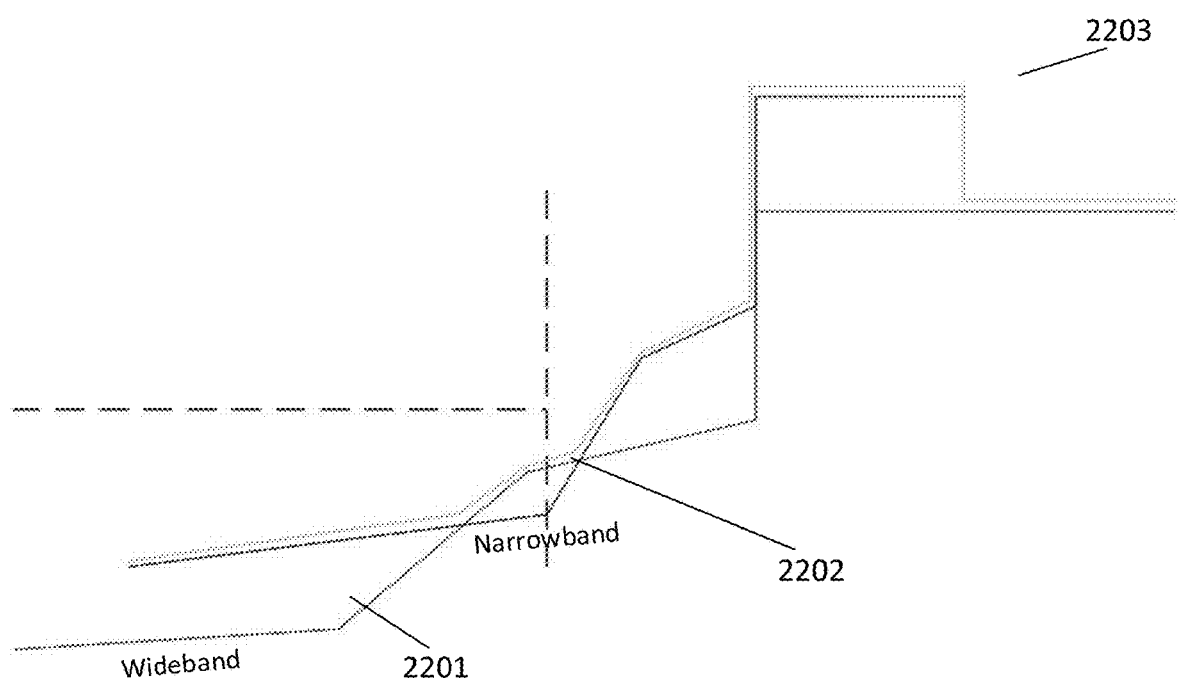
FIG. 22 shows an emission spectrum of a signal comprising a wideband preamble and a narrowband data payload.

FIG. 22 shows the emission spectrum of a combined signal comprising a non-concurrent wideband signal 2201 and narrowband signal 2202. In this case, the narrowband signal 2201 and the wideband signal 2202 are combined to form a composite signal 2203. The functional combined signal approximates a superimposition of the narrowband and the wideband signal. According to this figure, the spectrum's success in conforming to the regulation depends on the ratio of wideband signal to narrowband signal, and on the transmit power.

FIG. 23 shows an exemplary table with stored maximum transmit power values corresponding to packet size and channel. Demonstrably, FIG. 23 shows 2 MHz Route Update ("RU") packet transmission power limits in decibel-milliwatts. In this table, packets are divided into length by short packets 2301 and long packets 2302. In this case, the difference between a short packet and a long packet can be selected to meet the needs of the application. For example, a distinction between short packets 2301 and long packets 2302 can be based on a number of bytes to transmit a number of OFDM symbols, a length of time to transmit, or any other value capable of distinguishing between lengths. Whatever the method, the value that distinguishes between short packets 2301 and long packets 2302 can be stored in memory, either as a range of values, or as a single delineating value, such that a packet length that is less than the value is short, and a packet that is greater than the value is long. The determination of whether a packet equal to the value is short or long can be programmed depending on preference. It is expressly noted that the table in FIG. 23 is specifically for 2 MHz RUs, and thus a narrowband signal.

Other table data would be necessary to demonstrate the power limits for other signals, such as 4 MHz or 8 MHz signals. The selection of 2 MHz in this figure is simply demonstrative and is not intended to be exclusive or limiting.

In FIG. 23, the short packets 2301 and long packets 2302 have a plurality of transmission power limits (columns two through five), which are further ordered by Wi-Fi channel 2303 and transmission chain, in this case transmission chain A 2304 and transmission chain B 2305. A person skilled in the art would appreciate that maximum transmit power can be allocated between groups of channels. For example, power transmit thresholds may be bundled between channels 1-6 and channels 7-13. The distinction between Chain A 2304 and Chain B 2305 takes into account multiple antennas, which in this case is two antennas, but is not limited to two antennas, and could be any number of antennas in an application. Moreover, the examples presented herein are typically presented in a simplified form using only a long and a short packet length. A person skilled in the art will appreciate that packets may be configured in a variety of lengths beyond simply long and short. The use of the simplified long and short packets is for demonstrative purposes and is not intended to be exclusive or limiting. Where it is desired to add additional categories or ranges of packet length beyond short packets and long packets, this would necessitate an additional column in the table of maximum transmit power for each additional category or range.

A person skilled in the art will recognize that the table in FIG. 23 corresponds to a band-edge regulation rather than a power spectrum density regulation, although it may correspond to multiple regulatory requirements. In this figure, and to the extent that there is a difference between the maximum transmit power values for short packets and long packets, long packets may be permitted to transmit at higher values than short packets. Because long packets are functionally narrowband packets, and because narrowband transmissions are less likely than wideband transmissions to exceed a band-edge threshold, it may be reasonable to transmit longer packets at higher transmit power limits. On the other hand, because short packets are functionally wideband packets, and because wideband packets have a greater likelihood of exceeding a band-edge regulation, it may be reasonable to transmit short packets at a lower maximum transmit power to better ensure compliance with the band-edge regulation. This system of assigning greater transmit power values to long packets and smaller transmit power values to short packets may be desirable in markets or jurisdictions where there is a need to comply with a band-edge requirement. This may include, but is not limited to, the United States of America.

As described throughout herein, it is expressly contemplated that the disclosed distinction between sizes of transmit packets can also be used to better ensure compliance with power spectral density regulations. Although not specifically depicted, such as system may largely resemble the table in FIG. 23, except that the table would generally assign greater maximum transmit values to short packets and smaller maximum transmit values to short packets. Because long narrowband packets more likely to exceed a power spectral density regulation, for the reasons described above, it may be desirable to transmit long packets with lower transmission power than short packets. Where packets according to 802.11ax assign a narrowband RU, such as those displaced in FIG. 23, the principles discussed herein can be used to limit the narrowband RU transmissions and thus better ensure compliance with the relevant regulations.

Such a system may be desirable in markets where devices must comply with a power spectral density regulation. Such markets may include, but are not limited to, markets in the European Union.

Figure 24:
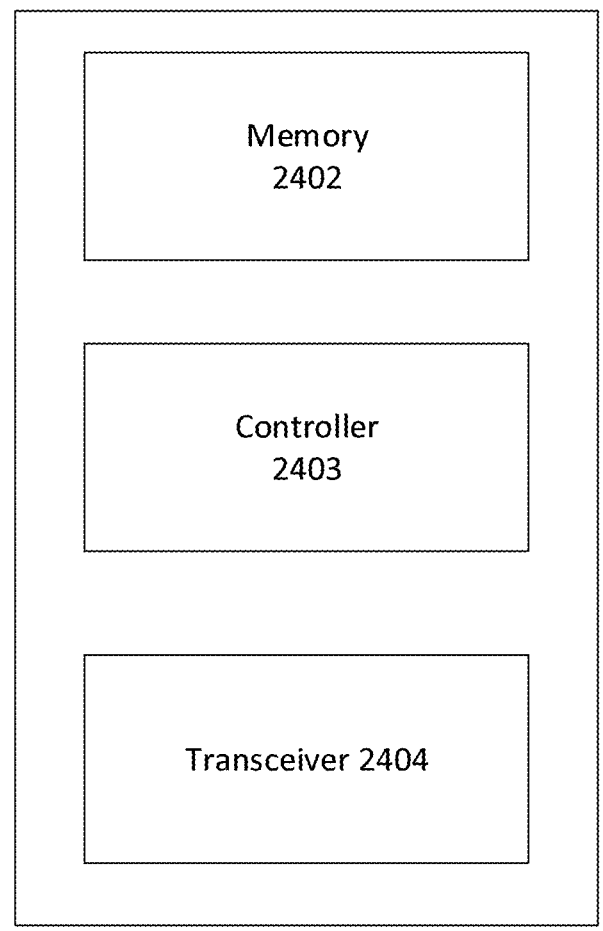
FIG. 24 shows an system for managing transmit power.

FIG. 24 is a system for managing transmit power 2401 comprising a memory 2402, configured to store a plurality of maximum transmit power values for packet transmission, each maximum transmit power value corresponding to one of a plurality of packet size ranges; a controller 2403, configured to determine a size of a packet for transmission; to identify a packet size range corresponding to the determined packet size; and to select a maximum transmit power value from the identified packet size range for transmission of the packet; and a transceiver 2404, configured to transmit a packet at the selected maximum transmit power value. The memory 2402 may be any type of memory that is capable of storing a plurality of maximum transmit power values, without exclusion. According to one aspect of the disclosure, the memory 2402 may be non-volatile memory. Where non-volatile memory is used, data associated with the stored power values can be transferred from the non-volatile memory, to a firmware memory (not depicted), to the controller 2403, to the transceiver 2404. According to another aspect of the disclosure, the maximum transmit power values for packet transmission may be stored in one or more tables. According to another aspect, the data may be arranged in tables, such that each table corresponds to a payload bandwidth.

Figure 25:
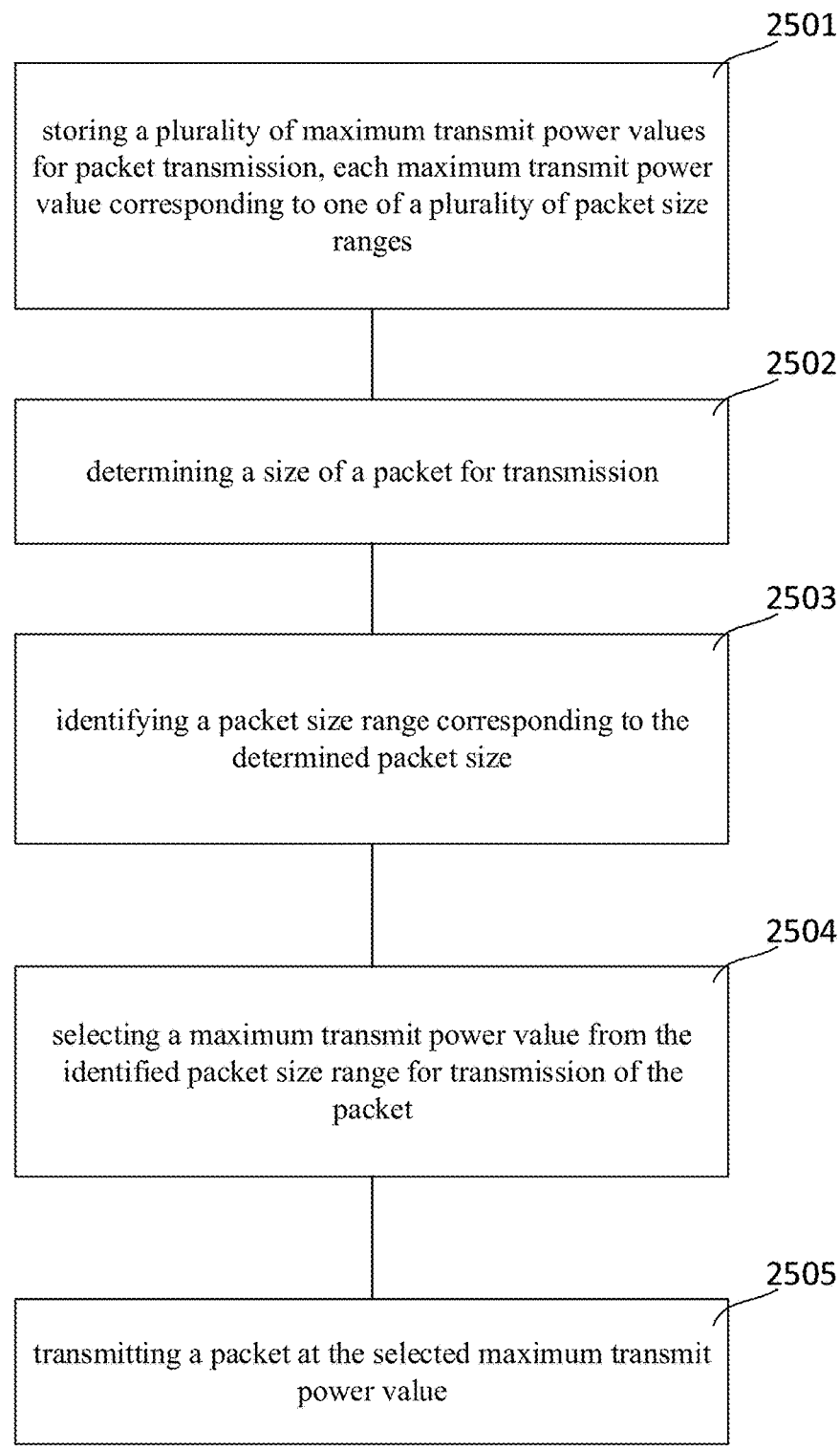
FIG. 25 shows a method for managing transmit power.

FIG. 25 is a method of managing transmit power comprising storing a plurality of maximum transmit power values for packet transmission, each maximum transmit power value corresponding to one of a plurality of packet size ranges 2501; determining a size of a packet for transmission 2502; identifying a packet size range corresponding to the determined packet size 2503; selecting a maximum transmit power value corresponding to the identified packet size range for transmission of the packet 2504; and transmitting a packet at the selected maximum transmit power value 2505. According to one aspect of the disclosure, the stored plurality of maximum transmit power values for packet transmission may be arranged according to bandwidth, based on the bandwidth sensitivity of the principles discussed herein.

With respect to the band-edge requirement, longer narrowband packets may be transmitted with higher transmit power than shorter packets, and still conform to the regulations. Similarly, packet size is also meaningful for compliance with power spectral density requirements. Specifically, packets with a long narrowband payload, which may be functionally considered narrowband packets for measurement purposes, put most of the transmit power on a narrow spectrum and thus reach higher power spectral density. Conversely, packets with a short narrowband payload, which are almost wideband packets for measurement purposes, put the same transmit power on a wider spectrum and thus operate with lower power spectral density. Thus, shorter packets with a narrowband payload may be transmitted at a higher transmit power than longer packets and still comply with the power spectral density regulations.

Thus, the ability to distinguish between packets based upon their duration can allow for more tailored assignment of limitations to transmit power. The transmit power limitations stored in the nonvolatile memory would thus not only correspond to the performance expected from the device but also the key performance indicators observable by customers and considered by them as one of the criteria for product satisfaction.

Because prior iterations of Wi-Fi before 802.11ax maintained a consistent bandwidth across the entire packet, it was unnecessary to tailor the transmission power to a packet length. Thus, where there is an approximately 100% duty cycle, meaning virtually no periods of silence, which is how regulatory tests are generally performed, there was previously no distinction between performance for long packets and short packets. However, the difference in bandwidth within the 11ax standards introduces a new variable, and thus a new degree of freedom. Even where tests are performed under 11ax within 100% duty cycles, the distinction between long packets and short packets affects the transmission spectrum.

In the past, transmission thresholds designed to maintain compliance with regulatory standards have been stored in the nonvolatile memory. These transmission thresholds place limitations on transmission, such that standards for band-edge and/or power spectral density are maintained. In standards prior to 802.11ax, the preamble and the payload had the same bandwidth. As of the 802.11ax, the preamble and the payload may have different bandwidths, which results in the need for a new solution to achieve regulatory compliance. In light of this change according to the 801.11ax standard, a more tailored solution for maximum power transmissions according to bandwidth and package duration is described herein.

Within the context of Wi-Fi, it is common to mix long packets and short packets. That is, a long packet may be immediately followed by a short packet, which then may immediately be followed by a long packet. This changing packet duration may result in frequent changes to the functional bandwidth, and therefore frequent changes to the out of band power or band-edge or power spectral density. This may necessitate frequent reference to the table to determine a proper maximum transmit value for transmission of the packet. According to one aspect of the disclosure, the table will be consulted before each packet transmission to ensure proper maximum transmit value. According to another aspect of the disclosure, the table will be consulted with the packet size changes or changes beyond a threshold.

According to one aspect of the disclosure, a plurality of packet length dependent limitations to the transit power are stored in the nonvolatile memory. There may be multiple packet length dependent limitations in each transmission mode, such as transmission chains, Wi-Fi channels, etc. Each limitation may consider the regulatory parameters and may continue to correspond to the worst-case scenario for testing methods such as the shortest packet for band-edge or the longest packet for power spectral density, wherein the preamble bandwidth and the payload bandwidth are different, as is now possible according to 802.11ax. However, these limitations do not assume packet length to be arbitrary, but rather correspond to various ranges of packet length. For example, in an instance where it is determined that the difference between a short packet in a long packet is 400 usec, the regulatory limits will typically consider the worst-case scenario for a long packet as a worst-case for a duration exceeding 400 usec, but excluding a case where the duration is less than 400 usec.

Greater efficiency can be achieved by determining and storing additional limits based on additional ranges of packet length. For example, one level may correspond to a packet exceeding T microseconds, and a second level may correspond to packets below T microseconds. With respect to band-edge requirements, it is expected that channel testing within the limits above T microseconds will yield beneficial results for band-edge requirements, since these packets will be dominated by the narrowband transmission, and the third order intermodulations will result in reliable compliance of the band-edge regulations. Conversely, the testing of channels dominated by power spectral density is expected to yield the greatest benefits in the limits below T microseconds, given that these packets will not have a dominant high-power spectral density narrowband transmission, and therefore their average power spectral density is anticipated to be lower.

According to another aspect of this disclosure, the limits described herein may be stored in non-volatile memory. These limits may be saved in a table form, such as a lookup table. A device using wireless communication, including but not limited to Wi-Fi, may access the tables or data saved in the non-volatile memory and implement the corresponding levels in accordance with the packet length and/or bandwidth relative to the transmission.

According to one aspect of the disclosure, the stored data may comprise absolute numbers, such as transmission power limits. According to another aspect of the disclosure, the stored data may comprise acceptable variations or changes rather than an absolute number. For example, a lookup table may this the data in terms of a reduction or increase in transmission power limits, rather than an absolute limit.

According to one aspect of the disclosure, where the transmit packet comprises portions of different bandwidths, such as under 802.11ax, it may be preferable for the non-volatile memory to have an extended table, such that it has more than one value per bandwidth, and potentially even more than one value per bandwidth per channel. This could comprise two values, three values, or more. A person skilled in the art will appreciate that the possibility of having different bandwidths for a packet preamble and a packet payload, as introduced by 802.11ax, affects the observed signal in the manner described herein, and thus can have significant implications for regulatory compliance. The resulting effect on the observed signal, and therefore also the resulting effect on the regulatory compliance, is dictated at least by a degree of disparity in the bandwidth between the preamble and the payload, and further affected by the size of the payload. That is to say that the changes to the observed signal with respect to regulatory compliance may be greater where there is a greater disparity between the preamble bandwidth and the payload bandwidth.

Turning specifically to 802.11ax, the payload according to 802.11ax may also be assigned a wider bandwidth, such as 20 MHz, 40 MHz, 80 MHz, or 160 MHz; however, where this occurs the preamble bandwidth is the same as the payload bandwidth, and in that scenario, the size of the payload plays no role in altering the observed bandwidth for purposes of regulatory compliance.

According to 802.11ax, the payload may have bandwidths that are narrower than the payload, for example bandwidths of 2 MHz, 4 MHz, or 8 Mhz. For the reasons, described herein, where a payload's bandwidth is narrower than the preamble's bandwidth, the size of the payload alters the observed signal, thereby creating considerations for regulatory compliance. Such a change in the observed signal is not limited to payload bandwidths of 2 MHz, 4 MHz, or 8 Mhz under 802.11ax, but rather can occur anytime the preamble and payload have different bandwidths. It is expressly anticipated that future editions of the 802.11 series, as well as other wireless communication standards, may permit differences in the preamble bandwidth and the payload bandwidth, whether using 2 MHz, 4 MHz, or 8 Mhz bandwidths, or otherwise. The references to 2 MHz, 4 MHz, or 8 Mhz are provided as examples only and are not intended to be limiting.

According to one aspect of the disclosure, each channel may be assigned a maximum transmit value for two ranges of bandwidth, such that each channel has a maximum transmit value assigned to a small bandwidth (based on a large data payload) or a large bandwidth (based on a small data payload).

According to another aspect of the disclosure, each channel may be assigned a maximum transmit value for four or more ranges of bandwidth, as a continuation of the manner stated above.

According to one aspect of the disclosure, the system for managing transmit power comprises a memory, configured to store a plurality of maximum transmit power values for packet transmission, each maximum transmit power value corresponding to one of a plurality of packet size ranges; a controller, configured to determine a size of a packet for transmission; to identify a packet size range corresponding to the determined packet size; and to select a maximum transmit power value from the identified packet size range for transmission of the packet; and a transceiver, configured to transmit a packet at the selected maximum transmit power value.

According to another aspect of the disclosure, managing the transmit power requires determining the size of the packet for transmission. This determination is based on at least a size of a packet data payload. That is, the packet payload is examined for its size. The size of the packet payload can be determined in isolation, meaning only considering the payload itself, or in conjunction with another aspect or aspects of the packet, such as the preamble. The size of the packet payload can be determined based on the number of bytes to be transmitted, the number of OFDM symbols required to transmit the packet, the time to transmit the packet, or any other method of determining a size of the packet. If the transmission time is used to determine the size of the packet, the transmission time may be measured in any unit that is desired, including, but not limited to, microseconds. Depending on the method used, this may be discussed herein as the packet size or the packet payload size. In light of the standardized length of the packet preamble under the anticipated Wi-Fi standards, differences in packet size are largely attributable to differences in packet payload.

Once the packet size is determined, a corresponding maximum transmit power value must be assigned. This assignment is achieved based on the manner used to measure the packet size. That is, where the size is determined by a duration required for transmission, the maximum transmit power value is assigned based on this duration. Similarly, where packet size is determined based on the number of OFDM symbols or bytes to be transmitted, the maximum transmit power value is assigned based on this number of symbols or bytes, respectively.

The packet size corresponds to one of a plurality of packet size ranges. According to one aspect of the disclosure, the system uses two packet size ranges, wherein each packet corresponds to one of the two packet size ranges. The packet size ranges can be considered short or long, large or small, or any other set of terms to differentiate between them. The packet ranges may be defined in absolute terms, such as a range of bytes, a range of OFDM symbols, a range of transmission time, etc. Alternatively, the packet size range may be defined based on a single threshold which demarcates a first range from a second range. For example, a single number of bytes n can be selected as the threshold, such that for the actual number of bytes a, where a<n, a∈Range 1, and where a>n, a∈Range 2. The determination of whether a∈Rang 1 or Range 2 where a=n can be assigned based on preference.

According to another aspect of the disclosure, there may be more than two size ranges. The number of size ranges is not limited, and the number of size ranges can be as large as desirable for a product, an implementation, or otherwise. For instance, and without limitation, the number of ranges can be 2, 3, 4, 5, or greater.

Each packet size range will correspond to a maximum transmit power value. According to one aspect of the disclosure, the entire maximum transmit power value for a size range will be assigned to that range, such that a packet corresponding to that range will be transmitted with the corresponding maximum transmit power value. According to another aspect of the disclosure, the corresponding maximum transmit power value can be divided into two or more groups corresponding to transmit chains. It is anticipated that the system or device performing the transmission may be capable of transmission with a plurality of antennas. Where such multiple-antenna transmission is possible, one or more antennas may transmitted according to one or more transmit chains. For each antenna transmitting on the same channel, the total maximum transmit power value may be divided among the transit chains. For example, where a maximum transmit power value of 40 dBm is permitted, the 40 dBm may be divided between two transmission chains in the same channel, whereby each transmission chain is permitted to transmit with 37 dBm, based on a reduction of 3 dB, which the skilled person will understand as resulting from a reduction of 3 dBm per antenna, based on $3=(10)\log_{10}(2)$. The power limits herein have generally been presented per antenna. It is expressly contemplated that the power limits, methods, and principles described herein can be applied to both single input single output (SISO) systems and multiple input multiple output (MIMO) systems.

The transmission channels described herein may be, for example, transmission channels in accordance with WLAN or Wi-Fi, as well as for other radio communication technologies such as, but not limited to, LTE, 5G, and WiGig It is expressly contemplated that the principles, methods, and devices described herein may be applied to any packet-based radio communication technology in which the packets may be configured with differing bandwidths between the packet preamble and the packet payload. These may be channels in accordance with past, current, or future standards for wireless transmission. Where a plurality of transmission channels are possible, the plurality of transmission channels may be further grouped into band-edge-channels and non-band-edge channels. A person skilled in the art will understand that band-edge channels are channels located at the outer portions of the bandwidth, whereas non-band-edge channels are channels located away from the edge of the bandwidth. The distinction between band-edge channels and non-band-edge channels is particularly relevant for band-edge regulations, since the likelihood of exceeding a band-edge regulation may be greater on a band-edge channel than in a non-band-edge channel.

As previously stated, it is anticipated that the system of assigning maximum transmit power values based at least in part on packet size, rather than using the legacy system of assigning a single maximum transmit power value based on the channel or device regardless of the packet size, will permit devices to transmit at least some packets at a higher transmit power and still comply with the relevant regulations, in particular, band-edge regulations or power spectrum density regulations.

According to one aspect of the disclosure, the memory for storing a maximum transmit power value is non-volatile memory, including, but not limited to, a one-time programmable non-volatile memory, an electrically erasable programmable read-only memory (EEPROM), or a platform non-volatile memory. This allows the device to be programmed with a table of maximum transmit power values at or near the time of manufacture and to retain those values such that they are not lost during shutoff or reboot. Depending on the memory, the maximum transmit power values can be stored as absolute values (such as values corresponding to a range), a threshold value to differentiate between two ranges, or a value to denote a distance from a given value or range.

This system may apply to any wireless communication wherein a packet preamble is a different bandwidth from a corresponding packet data payload. It is expressly anticipated that this system may be used in Wi-Fi or WLAN communication, and especially with respect to Wi-Fi or WLAN communication pursuant to IEEE Standard 802.11ax. It is further anticipated that this system can be used on future releases of IEEE Standard 802.11ax or on future releases of wireless communication standards that describe transmission of a preamble on a different bandwidth from the data payload.

The management of transmit power is further disclosed as described in Attachment A, as appended hereto. Portions of said disclosure have been redacted for privacy or security.

While the above descriptions reference various IEEE 802.11ax configurations, the use of these examples serve to enhance the clarity of the description and do not limit the applicability or scope of the techniques described herein.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The following examples pertain to further aspects of this disclosure:

Example 1 is a method of performing wireless communications at a wireless device, the method including identifying a scheduled transmission including a first section having a first bandwidth and a second section having a second bandwidth, selecting a transmit power limit for the scheduled transmission based on a relative duration of the first section compared to the second section, selecting a transmit power value based on the transmit power limit, and performing the scheduled transmission with a transmit power indicated by the transmit power value.

In Example 2, the subject matter of Example 1 can optionally include wherein selecting the transmit power limit for the scheduled transmission includes selecting the transmit power limit from a lookup table based on the relative duration of the first section compared to the second section.

In Example 3, the subject matter of Example 2 can optionally include the method further including identifying a geographic location in which the wireless device is operating, prior to selecting the transmit power value, selecting the lookup table from a plurality of lookup tables based on the geographic location.

In Example 4, the subject matter of Example 3 can optionally include wherein the plurality of lookup tables are based on emission restrictions for different geographic locations.

In Example 5, the subject matter of any one of Examples 2 to 4 can optionally include wherein the relative duration is an input parameter to the lookup table and wherein the lookup tables maps different relative durations to different transmit power limits.

In Example 6, the subject matter of Example 1 can optionally include wherein the scheduled transmission has a predefined format where the first section has a fixed duration and the second section has a variable duration, and wherein selecting the transmit power limit for the scheduled transmission based on the relative duration includes selecting the transmit power limit from a lookup table based on a total duration of the scheduled transmission.

In Example 7, the subject matter of Example 6 can optionally include wherein a total duration of the scheduled transmission is an input parameter to the lookup table and wherein the lookup table maps different total durations to different transmit power limits.

In Example 8, the subject matter of Example 6 or 7 can optionally include wherein longer total durations correspond to smaller relative durations of the first section compared to the second section.

In Example 9, the subject matter of Example 1 can optionally include wherein the scheduled transmission has a predefined format where the first section has a fixed duration and the second section has a variable duration, and wherein selecting the transmit power limit for the scheduled transmission based on the relative duration includes selecting the transmit power limit from a lookup table based on a number of bytes of data in the second section.

In Example 10, the subject matter of Example 7 can optionally include wherein the number of bytes of data is an input parameter to the lookup table and wherein the lookup table maps different numbers of bytes of data to different transmit power limits.

In Example 11, the subject matter of Example 1 can optionally include wherein selecting the transmit power limit for the scheduled transmission based on the relative duration includes selecting the transmit power limit from a lookup table based on a ratio of a duration of the first section to a duration of the second section.

In Example 12, the subject matter of Example 11 can optionally include wherein the ratio of the duration of the first section to the duration of the second section is an input parameter to the lookup table that maps different ratios to different transmit power limits.

In Example 13, the subject matter of Example 1 can optionally include wherein selecting the transmit power limit for the scheduled transmission based on the relative duration includes selecting the transmit power limit based on a predefined mapping between a duration parameter and different transmit power limits, wherein the duration parameter is dependent the relative duration of the first section compared to the second section.

In Example 14, the subject matter of Example 13 can optionally include wherein the duration parameter is a ratio of the duration of the first section to the second section, or a total duration of the scheduled transmission.

In Example 15, the subject matter of Example 13 or 14 can optionally include wherein the predefined mapping maps different values of the duration parameter to different transmit power limits.

In Example 16, the subject matter of Example 13 or 14 can optionally include wherein the predefined mapping maps different pairs of the duration parameter and channels to different transmit power limits.

In Example 17, the subject matter of any one of Examples 13 to 16 can optionally include wherein the predefined mapping further maps different transmit power limits to one or more of different transmit chains, different numbers or types of antennas, different radio channels, different transmission bandwidths or numbers of subcarriers, or different emission restriction types.

In Example 18, the subject matter of any one of Examples 13 to 17 can optionally include wherein the first bandwidth is larger than the second bandwidth and wherein at least some of the predefined mapping maps progressively lower transmit power limits to band-edge transmissions with progressively larger relative durations of first sections compared to second sections.

In Example 19, the subject matter of any one of Examples 13 to 17 can optionally include wherein the first bandwidth is larger than the second bandwidth, and wherein at least some of the predefined mapping maps progressively higher transmit power limits to transmissions that have progressively larger relative durations of first sections compared to second sections and that are in spectrum dominated by power spectral density (PSD) emission restrictions.

In Example 20, the subject matter of Example 1 can optionally include wherein the first bandwidth is larger than the second bandwidth and wherein the relative duration of the first section compared to the second section is a first value, the method further including selecting a second transmit power limit greater than the transmit power limit for a second scheduled transmission, wherein a relative duration of a first section of the second scheduled transmission compared to a duration of a second section of the second scheduled transmission is a second value greater than the first value.

In Example 21, the subject matter of Example 20 can optionally include wherein the scheduled transmission and the second scheduled transmission are scheduled for transmission on a band-edge channel.

In Example 22, the subject matter of Example 1 can optionally include wherein the first bandwidth is greater than the second bandwidth and wherein the relative duration of the first section compared to the second section is a first value, the method further including selecting a second transmit power limit greater than the transmit power limit for a second scheduled transmission, wherein a relative duration of a first section of the second scheduled transmission compared to a duration of a second section of the second scheduled transmission is a second value less than the first value.

In Example 23, the subject matter of Example 22 can optionally include wherein the scheduled transmission and the second scheduled transmission are scheduled for transmission on a channel with a dominant power spectral density (PSD) emission restriction.

In Example 24, the subject matter of Example 1 can optionally include wherein the first bandwidth is greater than the second bandwidth and wherein the relative duration of the first section compared to the second section is a first value, the method further including selecting a second transmit power limit less than the transmit power limit for a second scheduled transmission, wherein a relative duration of a first section of the second scheduled transmission compared to a duration of a second section of the second scheduled transmission is a second value less than the first value.

In Example 25, the subject matter of Example 24 can optionally include wherein the scheduled transmission and the second scheduled transmission are scheduled for transmission on a channel with a dominant power spectral density (PSD) emission restriction.

In Example 26, the subject matter of Example 1 can optionally include wherein the first bandwidth is greater than the second bandwidth and wherein the relative duration of the first section compared to the second section is a first value, the method further including selecting a second transmit power limit less than the transmit power limit for a second scheduled transmission, wherein a relative duration of a first section of the second scheduled transmission compared to a duration of a second section of the second scheduled transmission is a second value greater than the first value.

In Example 27, the subject matter of Example 26 can optionally include wherein the scheduled transmission and the second transmission are scheduled for transmission on a band-edge channel.

In Example 28, the subject matter of Example 1 can optionally include wherein selecting the transmit power limit for the scheduled transmission includes classifying the scheduled transmission as a first duration range of a plurality of duration ranges based on the relative duration of the first section compared to duration of the second section, and selecting the transmit power limit based on the first duration range.

In Example 29, the subject matter of Example 28 can optionally include wherein selecting the transmit power limit based on the first duration range includes accessing a lookup table with the first duration range as an input parameter and identifying the transmit power limit as an output of the lookup table.

In Example 30, the subject matter of any one of Examples 1 to 29 can optionally include wherein the scheduled transmission is in a predefined format where the first section is a fixed-duration wideband preamble and the second section is a variable-duration narrowband data section.

In Example 31, the subject matter of any one of Examples 1 to 30 can optionally include wherein the scheduled transmission is a packet according to an Institute of Electrical and Electronics Engineers (IEEE) 802.11ax standard.

In Example 32, the subject matter of any one of Examples 1 to 31 can optionally include wherein selecting the transmit power value based on the transmit power limit includes selecting a preliminary transmit power value for the scheduled transmission, and clipping the preliminary transmit power value to obtain the transmit power value if the preliminary transmit power value is greater than the transmit power limit, or using the preliminary transmit power value as the transmit power value if the preliminary transmit power is less than or equal to the transmit power limit.

Example 33 is a wireless device including a controller configured to identify a scheduled transmission including a first section having a first bandwidth and a second section having a second bandwidth, select a transmit power limit for the scheduled transmission based on a relative duration of the first section compared to the second section, and select a transmit power value based on the transmit power limit, and a transmitter configured to perform the scheduled transmission with a transmit power indicated by the transmit power value.

In Example 34, the subject matter of Example 33 can optionally further include one or more antennas, wherein the transmitter is configured to wirelessly transmit the scheduled transmission via the one or more antennas.

In Example 35, the subject matter of Example 33 or 34 can optionally include wherein the wireless device is configured as a cell for wireless communications.

In Example 36, the subject matter of Example 33 or 34 can optionally include wherein the wireless device is configured as a terminal device for wireless communications.

In Example 37, the subject matter of any one of Examples 33 to 36 can optionally include wherein the controller is configured to select the transmit power limit for the scheduled transmission by selecting the transmit power limit from a lookup table based on the relative duration of the first section compared to the second section.

In Example 38, the subject matter of Example 37 can optionally include wherein the controller is further configured to identify a geographic location in which the wireless device is operating and, prior to selecting the transmit power value, select the lookup table from a plurality of lookup tables based on the geographic location.

In Example 39, the subject matter of Example 38 can optionally include wherein the plurality of lookup tables are based on emission restrictions for different geographic locations.

In Example 40, the subject matter of any one of Examples 37 to 39 can optionally include wherein the relative duration is an input parameter to the lookup table and wherein the lookup tables maps different relative durations to different transmit power limits.

In Example 41, the subject matter of any one of Examples 33 to 36 can optionally include wherein the scheduled transmission has a predefined format where the first section has a fixed duration and the second section has a variable duration, and wherein the controller is configured to select the transmit power limit for the scheduled transmission based on the relative duration by selecting the transmit power limit from a lookup table based on a total duration of the scheduled transmission.

In Example 42, the subject matter of Example 41 can optionally include wherein a total duration of the scheduled transmission is an input parameter to the lookup table and wherein the lookup table maps different total durations to different transmit power limits.

In Example 43, the subject matter of Example 41 or 42 can optionally include wherein longer total durations correspond to smaller relative durations of the first section compared to the second section.

In Example 44, the subject matter of any one of Examples 33 to 36 can optionally include wherein the scheduled transmission has a predefined format where the first section has a fixed duration and the second section has a variable duration, and wherein the controller is configured to select the transmit power limit for the scheduled transmission based on the relative duration by selecting the transmit power limit from a lookup table based on a number of bytes of data in the second section.

In Example 45, the subject matter of Example 44 can optionally include wherein the number of bytes of data is an input parameter to the lookup table and wherein the lookup table maps different numbers of bytes of data to different transmit power limits.

In Example 46, the subject matter of any one of Examples 33 to 36 can optionally include wherein the controller is configured to select the transmit power limit for the scheduled transmission based on the relative duration by selecting the transmit power limit from a lookup table based on a ratio of a duration of the first section to a duration of the second section.

In Example 47, the subject matter of Example 46 can optionally include wherein the ratio of the duration of the first section to the duration of the second section is an input parameter to a lookup table that maps different ratios to different transmit power limits.

In Example 48, the subject matter of any one of Examples 33 to 36 can optionally include wherein the controller is configured to select the transmit power limit for the scheduled transmission based on the relative duration by selecting the transmit power limit based on a predefined mapping between a duration parameter and different transmit power limits, wherein the duration parameter is dependent the relative duration of the first section compared to the second section.

In Example 49, the subject matter of Example 48 can optionally include wherein the duration parameter is a ratio of the first section to the second section, or a total duration of the scheduled transmission.

In Example 50, the subject matter of Example 48 or 49 can optionally include wherein the predefined mapping maps different values of the duration power to different transmit power limits.

In Example 51, the subject matter of Example 48 or 49 can optionally include wherein the predefined mapping maps different pairs of the duration parameter and channels to different transmit power limits.

In Example 52, the subject matter of any one of Examples 48 to 51 can optionally include wherein the predefined mapping further maps different transmit power limits to one or more of different transmit chains, different numbers or types of antennas, different radio channels, different transmission bandwidths or numbers of subcarriers, or different emission restriction types.

In Example 53, the subject matter of any one of Examples 48 to 52 can optionally include wherein the first bandwidth is larger than the second bandwidth, and wherein at least some of the predefined mapping maps progressively lower transmit power limits to band-edge transmissions with progressively larger relative durations of first sections compared to second sections.

In Example 54, the subject matter of any one of Examples 48 to 52 can optionally include wherein the first bandwidth is larger than the second bandwidth, and wherein at least some of the predefined mapping maps progressively higher transmit power limits to transmissions that have progressively larger relative durations of first sections compared to second sections and that are in spectrum dominated by power spectral density (PSD) emission restrictions.

In Example 55, the subject matter of any one of Examples 33 to 36 can optionally include wherein the first bandwidth is larger than the second bandwidth and wherein the relative duration of the first section compared to the second section is a first value, wherein the controller is further configured to select a second transmit power limit greater than the transmit power limit for a second scheduled transmission, wherein a relative duration of a first section of the second scheduled transmission compared to a duration of a second section of the second scheduled transmission is a second value greater than the first value.

In Example 56, the subject matter of Example 55 can optionally include wherein the scheduled transmission and the second scheduled transmission are scheduled for transmission on a band-edge channel.

In Example 57, the subject matter of any one of Examples 33 to 36 can optionally include wherein the first bandwidth is greater than the second bandwidth and wherein the relative duration of the first section compared to the second section is a first value, wherein the controller is further configured to select a second transmit power limit greater than the transmit power limit for a second scheduled transmission, wherein a relative duration of a first section of the second scheduled transmission compared to a duration of a second section of the second scheduled transmission is a second value less than the first value.

In Example 58, the subject matter of Example 57 can optionally include wherein the scheduled transmission and the second scheduled transmission are scheduled for transmission on a channel with a dominant power spectral density (PSD) emission restriction.

In Example 59, the subject matter of any one of Examples 33 to 36 can optionally include wherein the first bandwidth is greater than the second bandwidth and wherein the relative duration of the first section compared to the second section is a first value, wherein the controller is further configured to select a second transmit power limit less than the transmit power limit for a second scheduled transmission, wherein a relative duration of a first section of the second scheduled transmission compared to a duration of a second section of the second scheduled transmission is a second value less than the first value.

In Example 60, the subject matter of Example 59 can optionally include wherein the scheduled transmission and the second scheduled transmission are scheduled for transmission on a channel with a dominant power spectral density (PSD) emission restriction.

In Example 61, the subject matter of any one of Examples 33 to 36 can optionally include wherein the first bandwidth is greater than the second bandwidth and wherein the relative duration of the first section compared to the second section is a first value, wherein the controller is further configured to select a second transmit power limit less than the transmit power limit for a second scheduled transmission, wherein a relative duration of a first section of the second scheduled transmission compared to a duration of a second section of the second scheduled transmission is a second value greater than the first value.

In Example 62, the subject matter of Example 61 can optionally include wherein the scheduled transmission and the second transmission are scheduled for transmission on a band-edge channel.

In Example 63, the subject matter of any one of Examples 33 to 36 can optionally include wherein the controller is configured to select the transmit power limit for the scheduled transmission by classifying the scheduled transmission as a first duration range of a plurality of duration ranges based on the relative duration of the first section compared to duration of the second section, and selecting the transmit power limit based on the first duration range.

In Example 64, the subject matter of Example 63 can optionally include wherein the controller is configured to select the transmit power limit based on the first duration range by accessing a lookup table with the first duration range as an input parameter and identifying the transmit power limit as an output of the lookup table.

In Example 65, the subject matter of any one of Examples 33 to 64 can optionally include wherein the scheduled transmission is in a predefined format where the first section is a fixed-duration wideband preamble and the second section is a variable-duration narrowband data section.

In Example 66, the subject matter of any one of Examples 33 to 65 can optionally include wherein the scheduled transmission is a packet according to an Institute of Electrical and Electronics Engineers (IEEE) 802.11ax standard.

In Example 67, the subject matter of any one of Examples 33 to 66 can optionally include wherein the controller is configured to select the transmit power value based on the transmit power limit by selecting a preliminary transmit power value for the scheduled transmission, and clipping the preliminary transmit power value to obtain the transmit power value if the preliminary transmit power value is greater than the transmit power limit, or using the preliminary transmit power value as the transmit power value if the preliminary transmit power value is less than or equal to the transmit power limit.

Example 68 is a wireless device including one or more processors configured to identify a scheduled transmission including a first section having a first bandwidth and a second section having a second bandwidth, select a transmit power limit for the scheduled transmission based on a relative duration of the first section compared to the second section, select a transmit power value based on the transmit power limit, and control a transmitter to perform the scheduled transmission with a transmit power indicated by the transmit power value.

In Example 69, the subject matter of Example 68 can optionally include wherein the one or more processors are configured to select the transmit power limit for the scheduled transmission by selecting the transmit power limit from a lookup table based on the relative duration of the first section compared to the second section.

In Example 70, the subject matter of Example 69 can optionally include wherein the one or more processors are further configured to identify a geographic location in which the wireless device is operating and, prior to selecting the transmit power value, select the lookup table from a plurality of lookup tables based on the geographic location In Example 71, the subject matter of Example 70 can optionally include wherein the plurality of lookup tables are based on emission restrictions for different geographic locations.

In Example 72, the subject matter of any one of Examples 69 to 71 can optionally include wherein the relative duration is an input parameter to the lookup table and wherein the lookup tables maps different relative durations to different transmit power limits.

In Example 73, the subject matter of Example 68 can optionally include wherein the scheduled transmission has a predefined format where the first section has a fixed duration and the second section has a variable duration, and wherein the one or more processors are configured to select the transmit power limit for the scheduled transmission based on the relative duration by selecting the transmit power limit from a lookup table based on a total duration of the scheduled transmission.

In Example 74, the subject matter of Example 73 can optionally include wherein a total duration of the scheduled transmission is an input parameter to the lookup table and wherein the lookup table maps different total durations to different transmit power limits.

In Example 75, the subject matter of Example 73 or 74 can optionally include wherein longer total durations correspond to smaller relative durations of the first section compared to the second section.

In Example 76, the subject matter of Example 68 can optionally include wherein the scheduled transmission has a predefined format where the first section has a fixed duration and the second section has a variable duration, and wherein the one or more processors are configured to select the transmit power limit for the scheduled transmission based on the relative duration by selecting the transmit power limit from a lookup table based on a number of bytes of data in the second section.

In Example 77, the subject matter of Example 68 can optionally include wherein the number of bytes of data is an input parameter to the lookup table and wherein the lookup table maps different numbers of bytes of data to different transmit power limits.

In Example 78, the subject matter of Example 68 can optionally include wherein the one or more processors are configured to select the transmit power limit for the scheduled transmission based on the relative duration by selecting the transmit power limit from a lookup table based on a ratio of a duration of the first section to a duration of the second section.

In Example 79, the subject matter of Example 78 can optionally include wherein the ratio of the duration of the first section to the duration of the second section is an input parameter to a lookup table that maps different ratios to different transmit power limits.

In Example 80, the subject matter of Example 68 can optionally include wherein the one or more processors are configured to select the transmit power limit for the scheduled transmission based on the relative duration by selecting the transmit power limit based on a predefined mapping between a duration parameter and different transmit power limits, wherein the duration parameter is dependent the relative duration of the first section compared to the second section.

In Example 81, the subject matter of Example 80 can optionally include wherein the duration parameter is a ratio of the first section to the second section, or a total duration of the scheduled transmission.

In Example 82, the subject matter of Example 80 or 81 can optionally include wherein the predefined mapping maps different values of the duration power to different transmit power limits.

In Example 83, the subject matter of Example 80 or 81 can optionally include wherein the predefined mapping maps different pairs of the duration parameter and channels to different transmit power limits.

In Example 84, the subject matter of any one of Examples 80 to 83 can optionally include wherein the predefined mapping further maps different transmit power limits to one or more of different transmit chains, different numbers or types of antennas, different radio channels, different transmission bandwidths or numbers of subcarriers, or different emission restriction types.

In Example 85, the subject matter of any one of Examples 80 to 84 can optionally include wherein the first bandwidth is larger than the second bandwidth, and wherein at least some of the predefined mapping maps progressively lower transmit power limits to band-edge transmissions with progressively larger relative durations of first sections compared to second sections.

In Example 86, the subject matter of any one of Examples 80 to 84 can optionally include wherein the first bandwidth is larger than the second bandwidth, and wherein at least some of the predefined mapping maps progressively higher transmit power limits to transmissions that have progressively larger relative durations of first sections compared to second sections and that are in spectrum dominated by power spectral density (PSD) emission restrictions.

In Example 87, the subject matter of Example 68 can optionally include wherein the first bandwidth is larger than the second bandwidth and wherein the relative duration of the first section compared to the second section is a first value, wherein the one more processors are further configured to select a second transmit power limit greater than the transmit power limit for a second scheduled transmission, wherein a relative duration of a first section of the second scheduled transmission compared to a duration of a second section of the second scheduled transmission is a second value greater than the first value.

In Example 88, the subject matter of Example 87 can optionally include wherein the scheduled transmission and the second scheduled transmission are scheduled for transmission on a band-edge channels.

In Example 89, the subject matter of Example 68 can optionally include wherein the first bandwidth is greater than the second bandwidth and wherein the relative duration of the first section compared to the second section is a first value, wherein the one or more processors are further configured to select a second transmit power limit greater than the transmit power limit for a second scheduled transmission, wherein a relative duration of a first section of the second scheduled transmission compared to a duration of a second section of the second scheduled transmission is a second value less than the first value.

In Example 90, the subject matter of Example 89 can optionally include wherein the scheduled transmission and the second scheduled transmission are scheduled for transmission on a channel with a dominant power spectral density (PSD) emission restriction.

In Example 91, the subject matter of Example 68 can optionally include wherein the first bandwidth is greater than the second bandwidth and wherein the relative duration of the first section compared to the second section is a first value, wherein the one or more processors are further configured to select a second transmit power limit less than the transmit power limit for a second scheduled transmission, wherein a relative duration of a first section of the second scheduled transmission compared to a duration of a second section of the second scheduled transmission is a second value less than the first value.

In Example 92, the subject matter of Example 91 can optionally include wherein the scheduled transmission and the second scheduled transmission are scheduled for transmission on a channel with a dominant power spectral density (PSD) emission restriction.

In Example 93, the subject matter of Example 68 can optionally include wherein the first bandwidth is greater than the second bandwidth and wherein the relative duration of the first section compared to the second section is a first value, wherein the one or more processors are further configured to select a second transmit power limit less than the transmit power limit for a second scheduled transmission, wherein a relative duration of a first section of the second scheduled transmission compared to a duration of a second section of the second scheduled transmission is a second value greater than the first value.

In Example 94, the subject matter of Example 93 can optionally include wherein the scheduled transmission and the second transmission are scheduled for transmission on a band-edge channel.

In Example 95, the subject matter of Example 68 can optionally include wherein the one or more processors are configured to select the transmit power limit for the scheduled transmission by classifying the scheduled transmission as a first duration range of a plurality of duration ranges based on the relative duration of the first section compared to duration of the second section, and selecting the transmit power limit based on the first duration range.

In Example 96, the subject matter of Example 95 can optionally include wherein the one or more processors are configured to select the transmit power limit based on the first duration range by accessing a lookup table with the first duration range as an input parameter and identifying the transmit power limit as an output of the lookup table.

In Example 97, the subject matter of any one of Examples 68 to 96 can optionally include wherein the scheduled transmission is in a predefined format where the first section is a fixed-duration wideband preamble and the second section is a variable-duration narrowband data section.

In Example 98, the subject matter of any one of Examples 68 to 97 can optionally include wherein the scheduled transmission is a packet according to an Institute of Electrical and Electronics Engineers (IEEE) 802.11ax standard.

In Example 99, the subject matter of any one of Examples 68 to 98 can optionally include wherein the one or more processors are configured to select the transmit power value based on the transmit power limit by selecting a preliminary transmit power value for the scheduled transmission, and clipping the preliminary transmit power value to obtain the transmit power value if the preliminary transmit power value is greater than the transmit power limit, or using the preliminary transmit power value as the transmit power value if the preliminary transmit power value is less than or equal the transmit power limit.

Example 100 is a method of performing wireless communications at a wireless device, the method including identifying a scheduled transmission including a first section having a first bandwidth and a second section having a second bandwidth, selecting a transmit power limit for the scheduled transmission based on a duration of the first section and a duration of the second section, select a transmit power value based on the transmit power limit, and performing the scheduled transmission with a transmit power indicated by the transmit power value.

Example 101 is a wireless device including a controller configured to identify a scheduled transmission including a first section having a first bandwidth and a second section having a second bandwidth, select a transmit power limit for the scheduled transmission based on a duration of the first section and a duration of the second section, and select a transmit power value based on the transmit power limit, and a transmitter configured to perform the scheduled transmission with a transmit power indicated by the transmit power value.

Example 102 is a wireless device including one or more processors configured to identify a scheduled transmission including a first section having a first bandwidth and a second section having a second bandwidth, select a transmit power limit for the scheduled transmission based on a duration of the first section and a duration of the second section, select a transmit power value based on the transmit power limit, and control a transmitter to perform the scheduled transmission with a transmit power indicated by the transmit power value.

Example 103 is a wireless device including means for identifying a scheduled transmission including a first section having a first bandwidth and a second section having a second bandwidth, means for selecting a transmit power limit for the scheduled transmission based on a relative duration of the first section compared to the second section, means for selecting a transmit power value based on the transmit power limit, and means for performing the scheduled transmission with a transmit power indicated by the transmit power value.

Example 104 is a wireless device including means for identifying a scheduled transmission including a first section having a first bandwidth and a second section having a second bandwidth, means for selecting a transmit power limit for the scheduled transmission based on a duration of the first section and a duration of the second section, means for selecting a transmit power value based on the transmit power limit, and means for performing the scheduled transmission with a transmit power indicated by the transmit power value.

Example 105 is a method of performing wireless communications at a wireless device, the method including determining a geographic location of the wireless device, selecting a packet duration based on the geographic location, allocating pending data into a plurality of packets having the packet duration, wherein the packets have a first section with a first bandwidth and a second section with a second bandwidth, selecting a transmit power limit for the plurality of packets based on the packet duration and selecting a transmit power value based on the transmit power limit, and transmitting the plurality of packets with a transmit power indicated by the transmit power value.

In Example 106, the subject matter of Example 105 can optionally include wherein the first section has a fixed duration and the second section has a variable duration that depends on the packet duration and where the first bandwidth is narrower than the second bandwidth.

In Example 107, the subject matter of Example 106 can optionally include wherein the first section is a preamble and the second section is a data section, and wherein allocating the pending data into the plurality of packets includes separating the pending data based on the packet duration and including the separated pending data in the respective data sections of the plurality of packets.

In Example 108, the subject matter of any one of Examples 105 to 107 can optionally include wherein selecting the packet duration based on the geographic location includes selecting a first packet duration if the geographic location is subject to emission restrictions that are dominated by out-of-band (OOB) emission restrictions, and selecting a second packet duration shorter than the first packet duration if the geographic location is subject to emission restrictions that are dominated by power spectral density (PSD) emission restrictions.

In Example 109, the subject matter of any one of Examples 105 to 108 can optionally include wherein selecting the transmit power limit for the plurality of packets includes selecting the transmit power limit from a lookup table based on the packet duration.

In Example 110, the subject matter of Example 109 can optionally include wherein the packet duration is an input parameter to the lookup table and wherein the lookup tables maps different packet durations to different transmit power limits.

Example 111 is a wireless device including a controller configured to determine a geographic location of the wireless device, select a packet duration based on the geographic location, allocate pending data into a plurality of packets having the packet duration, wherein the packets have a first section with a first bandwidth and a second section with a second bandwidth, and select a transmit power limit for the plurality of packets based on the packet duration and selecting a transmit power value based on the transmit power limit, the wireless device further including a transmitter configured to transmit the plurality of packets with a transmit power indicated by the transmit power value.

In Example 112, the subject matter of Example 111 can optionally further include one or more antennas, wherein the transmitter is configured to wirelessly transmit the plurality of packets via the one or more antennas.

In Example 113, the subject matter of Example 111 or 112 can optionally include wherein the first section has a fixed duration and the second section has a variable duration that depends on the packet duration and where the first bandwidth is narrower than the second bandwidth.

In Example 114, the subject matter of Example 113 can optionally include wherein the first section is a preamble and the second section is a data section, and wherein the controller is configured to allocate the pending data into the plurality of packets by separating the pending data based on the packet duration and including the separated pending data in the respective data sections of the plurality of packets.

In Example 115, the subject matter of any one of Examples 111 to 114 can optionally include wherein the controller is configured to select the packet duration based on the geographic location by selecting a first packet duration if the geographic location is subject to emission restrictions that are dominated by out-of-band (OOB) emission restrictions, and selecting a second packet duration shorter than the first packet duration if the geographic location is subject to emission restrictions that are dominated by power spectral density (PSD) emission restrictions.

In Example 116, the subject matter of any one of Examples 111 to 115 can optionally include wherein the controller is configured to select the transmit power limit for the plurality of packets by selecting the transmit power limit from a lookup table based on the packet duration of the first section compared to the second section.

In Example 117, the subject matter of Example 116 can optionally include wherein the packet duration is an input parameter to the lookup table and wherein the lookup tables maps different packet durations to different transmit power limits.

Example 118 is a wireless device including one or more processors configured to determine a geographic location of the wireless device, select a packet duration based on the geographic location, allocate pending data into a plurality of packets having the packet duration, wherein the packets have a first section with a first bandwidth and a second section with a second bandwidth, select a transmit power limit for the plurality of packets based on the packet duration and selecting a transmit power value based on the transmit power limit, and control a transmitter to transmit the plurality of packets with a transmit power indicated by the transmit power value.

In Example 119, the subject matter of Example 118 can optionally include wherein the first section has a fixed duration and the second section has a variable duration that depends on the packet duration and where the first bandwidth is narrower than the second bandwidth.

In Example 120, the subject matter of Example 119 can optionally include wherein the first section is a preamble and the second section is a data section, and wherein the one or more processors are configured to allocate the pending data into the plurality of packets by separating the pending data based on the packet duration and including the separated pending data in the respective data sections of the plurality of packets.

In Example 121, the subject matter of any one of Examples 118 to 120 can optionally include wherein the one or more processors are configured to select the packet duration based on the geographic location by selecting a first packet duration if the geographic location is subject to emission restrictions that are dominated by out-of-band (OOB) emission restrictions, and selecting a second packet duration shorter than the first packet duration if the geographic location is subject to emission restrictions that are dominated by power spectral density (PSD) emission restrictions.

In Example 122, the subject matter of any one of Examples 118 to 121 can optionally include wherein the controller is configured to select the transmit power limit for the plurality of packets by selecting the transmit power limit from a lookup table based on the packet duration In Example 123, the subject matter of Example 122 can optionally include wherein the packet duration is an input parameter to the lookup table and wherein the lookup tables maps different packet durations to different transmit power limits.

Example 124 is a wireless device including means for determining a geographic location of the wireless device, means for selecting a packet duration based on the geographic location, means for allocating pending data into a plurality of packets having the packet duration, wherein the packets have a first section with a first bandwidth and a second section with a second bandwidth, means for selecting a transmit power limit for the plurality of packets based on the packet duration and selecting a transmit power value based on the transmit power limit, and means for transmitting the plurality of packets with a transmit power indicated by the transmit power value.

In Example 125, a system for managing transmit power is disclosed, including
a memory, configured to store a plurality of maximum transmit power values for packet transmission, each maximum transmit power value corresponding to one of a plurality of packet size ranges, a controller, configured to determine a size of a packet for transmission, to identify a packet size range corresponding to the determined packet size, and to select a maximum transmit power value from the identified packet size range for transmission of the packet, a transceiver, configured to transmit a packet at the selected maximum transmit power value.

In Example 126, the system for managing transmit power of Example 125 is disclosed, further including determining the size of the packet for transmission based on at least a size of a packet data payload.

In Example 127, the system for managing transmit power according to Examples 125 or 126 is disclosed, wherein the plurality of maximum transmit power values are categorized based on a duration for transmission of a packet.

In Example 128, the system for managing transmit power according to Example 127 is disclosed, wherein the duration of transmission is a duration in microseconds.

In Example 129, the system for managing transmit power according to Example 127 is disclosed, wherein the duration of transmission is a duration in orthogonal frequency division multiplexing symbols.

In Example 130, the system for managing transmit power according to Example 127 is disclosed, wherein the duration of transmission is a duration expressed in a number of bytes.

In Example 131, the system for managing transmit power according to any one of Examples 125 to 130 is disclosed, wherein the determined packet size corresponds to a first packet size range or a second size packet range.

In Example 132, the system for managing transmit power according to any one of Examples 125 to 130 is disclosed, wherein the maximum transmit power values correspond to a plurality of packet size ranges.

In Example 133, the system for managing transmit power according to any one of Examples 125 to 132 is disclosed, wherein the stored maximum transmit power values are grouped according to two packet size ranges.

In Example 134, the system for managing transmit power according to any one of Examples 125 to 132 is disclosed, wherein the stored maximum transmit power values are grouped according to three packet size ranges.

In Example 135, the system for managing transmit power according to any one of Examples 125 to 132 is disclosed, wherein the stored maximum transmit power values are grouped according to four or more packet size ranges.

In Example 136, the system for managing transmit power according to Example 133 is disclosed, wherein the two packet size ranges include a small packet size range and a large packet size range.

In Example 137, the system for managing transmit power according to any one of Examples 125 to 136 is disclosed, further including the maximum transmit value for a packet size range being distributed among a plurality of transmit chains.

In Example 138, the system for managing transmit power according to Example 137 is disclosed, wherein the maximum transmit power for a packet size range is distributed among a first transmit chain and a second transmit chain.

In Example 139, the system for managing transmit power according to any one of Examples 125 to 138 is disclosed, further including the stored maximum transmit power values corresponding to a plurality of transmission channels.

In Example 140, the system for managing transmit power according to Example 139 is disclosed, wherein the plurality of transmission channels are Wi-Fi channels.

In Example 141, the system for managing transmit power according to Examples 139 or 140 is disclosed, wherein the plurality of transmission channels are further divided by band-edge-channels and non-band-edge channels.

In Example 142, the system for managing transmit power according to any one of Examples 125 to 140 is disclosed, further including a first channel subset of maximum transmit power values corresponding to band-edge channels, and a second channel subset of maximum transmit power values corresponding to non-band-edge channels.

In Example 143, the system for managing transmit power according to Example 142 is disclosed, wherein the first channel subset includes channels in a 126.4 GHz band.

In Example 144, the system for managing transmit power according to Example 142 or 143 is disclosed, wherein the first channel subset includes channels 125, 135, 136, and 137.

In Example 145, the system for managing transmit power according to any one of Examples 142 through 144 is disclosed, wherein the second channel subset includes channels in a 126.4 GHz band.

In Example 146, the system for managing transmit power according to Example 145 is disclosed, wherein the second channel subset includes channels 126 through 134.

In Example 147, the system for managing transmit power according to any one of Examples 125 to 146 is disclosed, further including a plurality of channel subsets is disclosed, wherein each channel subset corresponds to a maximum transmit power and one or more channels.

In Example 148, the system for managing transmit power according to Example 147 is disclosed, wherein a channel subset corresponds to channels 160 through 188.

In Example 149, the system for managing transmit power according to Example 147 or 148 is disclosed, wherein a channel subset corresponds to channels 100 through 140.

In Example 150, the system for managing transmit power according to any one of Examples 125 to 149 is disclosed, wherein the maximum transmit power values are maximum transmit power values for transmission of the one or more large packet sizes in compliance with a power spectrum density regulation.

In Example 151, the system for managing transmit power according to any one of Examples 125 to 149 is disclosed, wherein the maximum transmit power values are maximum transmit power values for transmission of the one or more large packet sizes in compliance with a band-edge regulation.

In Example 152, the system for managing transmit power according to any one of Examples 125 to 151 is disclosed, wherein a second maximum transmit power is expressed as an increase or reduction from a first maximum transit power.

In Example 153, the system for managing transmit power according to any one of Examples 125 to 152 is disclosed, wherein the memory is a one-time programmable memory.

In Example 154, the system for managing transmit power according to any one of Examples 125 to 153 is disclosed, wherein the memory is a non-volatile memory.

In Example 155, the system for managing transmit power according to any one of Examples 125 to 154 is disclosed, further including a threshold stored in memory to differentiate between a first range of packet length and a second range of packet length.

In Example 156, the system for managing transmit power according to any one of Examples 125 to 155 is disclosed, further including the controller determining a threshold between a first range of a packet length and a second range of a packet length based on a bandwidth.

In Example 157, the system for managing transmit power according to any one of Examples 125 to 156 is disclosed, further including a 100 usec threshold in 144 MHz to distinguish between a first packet size range and a second packet size range.

In Example 158, the system for managing transmit power according to any one of Examples 125 to 156 is disclosed, further including a 174 usec threshold in 126 MHz to distinguish between a first packet size range and a second packet size range.

In Example 159, the system for managing transmit power according to any one of Examples 125 to 158 is disclosed, wherein the packet is transmitted on a wireless local area network.

In Example 160, the system for managing transmit power according to Example 159 is disclosed, wherein the wireless local area network is a Wi-Fi network.

In Example 161, the system for managing transmit power according to Example 159 is disclosed, wherein the wireless local area network is a WLAN network.

In Example 162, the system for managing transmit power according to any one of Examples 125 to 161 is disclosed, wherein the data packet is a data packet according to IEEE Standard 802.11ax.

In Example 163, the system for managing transmit power according to any one of Examples 125 to 162 is disclosed, wherein the packet is a data portion of an orthogonal frequency-division multiple access triggered uplink packet.

In Example 164, the system for managing transmit power according to any one of Examples 125 to 163 is disclosed, wherein the maximum power values for data packet transmission correspond to a regulatory requirement.

In Example 165, the system for managing transmit power according to Example 164 is disclosed, wherein the maximum transmit power value permits transmission of the packet in compliance with a band-edge regulation.

In Example 166, the system for managing transmit power according to Example 164 is disclosed, wherein the maximum transmit power value permits transmission of the packet in compliance with a power spectral density regulation.

In Example 167, a method of managing transmit power is disclosed including storing a plurality of maximum transmit power values for packet transmission, each maximum transmit power value corresponding to one of a plurality of packet size ranges, determining a size of a packet for transmission, identifying a packet size range corresponding to the determined packet size, selecting a maximum transmit power value from the identified packet size range for transmission of the packet, and transmitting a packet at the selected maximum transmit power value.

In Example 168, the method for managing transmit power of Example 167 is disclosed, further including determining the size of the packet for transmission based on at least a size of a packet data payload.

In Example 169, the method for managing transmit power according to Examples 167 or 168 is disclosed, wherein the plurality of maximum transmit power values are categorized based on a duration for transmission of a packet.

In Example 170, the method for managing transmit power according to Example 169 is disclosed, wherein the duration of transmission is a duration in microseconds.

In Example 171, the method for managing transmit power according to Example 169 is disclosed, wherein the duration of transmission is a duration in orthogonal frequency division multiplexing symbols.

In Example 172, the method for managing transmit power according to Example 169 is disclosed, wherein the duration of transmission is a duration expressed in a number of bytes.

In Example 173, the method for managing transmit power according to any one of Examples 167 to 172 is disclosed, wherein the determined packet size corresponds to a first packet size range or a second size packet range.

In Example 174, the method for managing transmit power according to any one of Examples 167 to 172 is disclosed, wherein the maximum transmit power values correspond to a plurality of packet size ranges.

In Example 175, the method for managing transmit power according to any one of Examples 167 to 174 is disclosed, wherein the stored maximum transmit power values are grouped according to two packet size ranges.

In Example 176, the method for managing transmit power according to any one of Examples 167 to 174 is disclosed, wherein the stored maximum transmit power values are grouped according to three packet size ranges.

In Example 177, the method for managing transmit power according to any one of Examples 167 to 174 is disclosed, wherein the stored maximum transmit power values are grouped according to four or more packet size ranges.

In Example 178, the method for managing transmit power according to Example 175 is disclosed, wherein the two packet size ranges include a small packet size range and a large packet size range.

In Example 179, the method for managing transmit power according to any one of Examples 167 to 178 is disclosed, further including the maximum transmit value for a packet size range being distributed among a plurality of transmit chains.

In Example 180, the method for managing transmit power according to Example 179 is disclosed, wherein the maximum transmit power for a packet size range is distributed among a first transmit chain and a second transmit chain.

In Example 181, the method for managing transmit power according to any one of Examples 167 to 180 is disclosed, further including the stored maximum transmit power values corresponding to a plurality of transmission channels.

In Example 182, the method for managing transmit power according to Example 181 is disclosed, wherein the plurality of transmission channels are Wi-Fi channels.

In Example 183, the method for managing transmit power according to Examples 181 or 182 is disclosed, wherein the plurality of transmission channels are further divided by band-edge-channels and non-band-edge channels.

In Example 184, the method for managing transmit power according to any one of Examples 167 to 182 is disclosed, further including a first channel subset of maximum transmit power values corresponding to band-edge channels, and a second channel subset of maximum transmit power values corresponding to non-band-edge channels.

In Example 185, the method for managing transmit power according to Example 184 is disclosed, wherein the first channel subset includes channels in a 126.4 GHz band.

In Example 186, the method for managing transmit power according to Example 184 or 185 is disclosed, wherein the first channel subset includes channels 125, 135, 136, and 137.

In Example 187, the method for managing transmit power according to any one of Examples 184 through 186 is disclosed, wherein the second channel subset includes channels in a 126.4 GHz band.

In Example 188, the method for managing transmit power according to Example 187 is disclosed, wherein the second channel subset includes channels 126 through 134.

In Example 189, the method for managing transmit power according to any one of Examples 167 to 188 is disclosed, further including a plurality of channel subsets is disclosed, wherein each channel subset corresponds to a maximum transmit power and one or more channels.

In Example 190, the method for managing transmit power according to Example 189 is disclosed, wherein a channel subset corresponds to channels 160 through 188.

In Example 191, the method for managing transmit power according to Example 189 or 190 is disclosed, wherein a channel subset corresponds to channels 100 through 140.

In Example 192, the method for managing transmit power according to any one of Examples 167 to 191 is disclosed, wherein the maximum transmit power values are maximum transmit power values for transmission of the one or more large packet sizes in compliance with a power spectrum density regulation.

In Example 193, the method for managing transmit power according to any one of Examples 167 to 191 is disclosed, wherein the maximum transmit power values are maximum transmit power values for transmission of the one or more large packet sizes in compliance with a band-edge regulation.

In Example 194, the method for managing transmit power according to any one of Examples 167 to 193 is disclosed, wherein a second maximum transmit power is expressed as an increase or reduction from a first maximum transit power.

In Example 195, the method for managing transmit power according to any one of Examples 167 to 194 is disclosed, wherein the memory is a one-time programmable memory.

In Example 196, the method for managing transmit power according to any one of Examples 167 to 195 is disclosed, wherein the memory is a non-volatile memory.

In Example 197, the method for managing transmit power according to any one of Examples 167 to 196 is disclosed, further including a threshold stored in memory to differentiate between a first range of packet length and a second range of packet length.

In Example 198, the method for managing transmit power according to any one of Examples 167 to 197 is disclosed, further including determining a threshold between a first range of a packet length and a second range of a packet length based on a bandwidth.

In Example 199, the method for managing transmit power according to any one of Examples 167 to 198 is disclosed, further including a 100 usec threshold in 144 MHz to distinguish between a first packet size range and a second packet size range.

In Example 200, the method for managing transmit power according to any one of Examples 167 to 198 is disclosed, further including a 174 usec threshold in 126 MHz to distinguish between a first packet size range and a second packet size range.

In Example 201, the method for managing transmit power according to any one of Examples 167 to 200 is disclosed, wherein the packet is transmitted on a wireless local area network.

In Example 202, the method for managing transmit power according to Example 201 is disclosed, wherein the wireless local area network is a Wi-Fi network.

In Example 203, the method for managing transmit power according to Example 201 is disclosed, wherein the wireless local area network is a WLAN network.

In Example 204, the method for managing transmit power according to any one of Examples 167 to 203 is disclosed, wherein the data packet is a data packet according to IEEE Standard 802.11ax.

In Example 205, the method for managing transmit power according to any one of Examples 167 to 204 is disclosed, wherein the packet is a data portion of an orthogonal frequency-division multiple access triggered uplink packet.

In Example 206, the method for managing transmit power according to any one of Examples 167 to 205 is disclosed, wherein the maximum power values for data packet transmission correspond to a regulatory requirement.

In Example 207, the method for managing transmit power according to Example 206 is disclosed, wherein the maximum transmit power value permits transmission of the packet in compliance with a band-edge regulation.

In Example 208, the method for managing transmit power according to Example 206 is disclosed, wherein the maximum transmit power value permits transmission of the packet in compliance with a power spectral density regulation.

In Example 209, an apparatus for managing transmit power is disclosed including
a memory, configured to store a plurality of maximum transmit power values for packet transmission, each maximum transmit power value corresponding to one of a plurality of packet size ranges,
a controller, configured to determine a size of a packet for transmission, to identify a packet size range corresponding to the determined packet size, and to select a maximum transmit power value from the identified packet size range for transmission of the packet,
a transceiver, configured to transmit a packet at the selected maximum transmit power value.

In Example 210, the apparatus for managing transmit power of Example 211 is disclosed, according to any one of the Examples 125 to 166.

In Example 211, the means for managing transmit power is disclosed including
a storing element, for storing a plurality of maximum transmit power values for packet transmission, each maximum transmit power value corresponding to one of a plurality of packet size ranges,
a controlling element, for determining a size of a packet for transmission, identifying a packet size range corresponding to the determined packet size, and selecting a maximum transmit power value from the identified packet size range for transmission of the packet,
a transmitting element, for transmitting a packet at the selected maximum transmit power value.

In Example 212, a non-transient computer readable medium is disclosed containing program instructions for causing a computer to perform the method of
storing a plurality of maximum transmit power values for packet transmission, each maximum transmit power value corresponding to one of a plurality of packet size ranges,
determining a size of a packet for transmission, to identify a packet size range corresponding to the determined packet size, and to select a maximum transmit power value from the identified packet size range for transmission of the packet,
transmitting a packet at the selected maximum transmit power value.

In Example 213, a non-transient computer readable medium is disclosed containing program instructions to cause a computer to perform the steps of any one of the Examples 167 to 210.

In Example 214, the system for managing transmit power according to Example 125 is disclosed, wherein the duration of transmission is a duration in transmission time.

In Example 215, the system for managing transmit power according to Example 125 is disclosed, wherein the duration of transmission is a duration expressed in a number of bytes for transmission.

In Example 216, the system for managing transmit power according to Example 125 is disclosed, further including the maximum transmit value for a packet size range being allocated among a plurality of transmit chains.

In Example 217, the system for managing transmit power according to any one of Examples 125 to 166 is disclosed, wherein a first range of the maximum transmit power values is assigned to one or more band edge channels, and a second range of maximum transmit power values is assigned to one or more non-band edge channels.

In Example 218, the system for managing transmit power according to any one of Examples 125 to 166 is disclosed, wherein the packet further includes a packet preamble and a packet payload.

In Example 219, the system for managing transmit power according to Example 218 is disclosed, further including the preamble being transmitted at a first bandwidth and the data packet being transmitted as a second bandwidth.

In Example 220, the system for managing transmit power according to Example 219 is disclosed, wherein the first bandwidth and second bandwidth are different.

Example 221 is a non-transitory computer readable storage medium including instructions that, when executed by one or more processors, cause the one or more processors to perform the method of any preceding Example.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A wireless device comprising a controller comprising one or more processors configured to:
   identify a scheduled transmission comprising a first section having a first bandwidth and a second section having a second bandwidth;
   select a transmit power limit for the scheduled transmission based on a relative duration of the first section compared to the second section; and
   select a transmit power value based on the transmit power limit;
   wherein the controller is configured to select the transmit power limit for the scheduled transmission by selecting the transmit power limit from a lookup table based on the relative duration of the first section compared to the second section.

2. The wireless device of claim 1, further comprising a transmitter configured to perform the scheduled transmission with a transmit power indicated by the transmit power value.

3. The wireless device of claim 2, further comprising one or more antennas, wherein the transmitter is configured to wirelessly transmit the scheduled transmission via the one or more antennas.

4. The wireless device of claim 1, wherein the relative duration is an input parameter to the lookup table and wherein the lookup table maps different relative durations to different transmit power limits.

5. The wireless device of claim 1, wherein the controller is configured to select the transmit power limit for the scheduled transmission based on the relative duration by selecting the transmit power limit based on a predefined mapping between a duration parameter and different transmit power limits, wherein the duration parameter is dependent the relative duration of the first section compared to the second section.

6. The wireless device of claim 1, wherein the first bandwidth is larger than the second bandwidth and wherein the relative duration of the first section compared to the second section is a first value,
   wherein the controller is further configured to:
   select a second transmit power limit greater than the transmit power limit for a second scheduled transmission, wherein a relative duration of a first section of the second scheduled transmission compared to a duration of a second section of the second scheduled transmission is a second value greater than the first value.

7. The wireless device of claim 6, wherein the scheduled transmission and the second scheduled transmission are scheduled for transmission on a band-edge channel.

8. The wireless device of claim 1, wherein the first bandwidth is greater than the second bandwidth and wherein the relative duration of the first section compared to the second section is a first value,
wherein the controller is further configured to:
select a second transmit power limit greater than the transmit power limit for a second scheduled transmission, wherein a relative duration of a first section of the second scheduled transmission compared to a duration of a second section of the second scheduled transmission is a second value less than the first value.

9. The wireless device of claim 8, wherein the scheduled transmission and the second scheduled transmission are scheduled for transmission on a channel with a dominant power spectral density (PSD) emission restriction.

10. A wireless device comprising a controller comprising one or more processors configured to:
identify a scheduled transmission comprising a first section having a first bandwidth and a second section having a second bandwidth;
select a transmit power limit for the scheduled transmission based on a relative duration of the first section compared to the second section; and
select a transmit power value based on the transmit power limit;
wherein the scheduled transmission has a predefined format where the first section has a fixed duration and the second section has a variable duration, and wherein the controller is configured to select the transmit power limit for the scheduled transmission based on the relative duration by selecting the transmit power limit from a lookup table based on a total duration of the scheduled transmission.

11. A wireless device comprising a controller comprising one or more processors configured to:
identify a scheduled transmission comprising a first section having a first bandwidth and a second section having a second bandwidth;
select a transmit power limit for the scheduled transmission based on a relative duration of the first section compared to the second section; and
select a transmit power value based on the transmit power limit;
wherein the controller is configured to select the transmit power limit for the scheduled transmission based on the relative duration by selecting the transmit power limit based on a predefined mapping between a duration parameter and different transmit power limits,
wherein the duration parameter is dependent the relative duration of the first section compared to the second section; and
wherein the duration parameter is a ratio of the first section to the second section, or a total duration of the scheduled transmission.

12. The wireless device of claim 11, wherein the predefined mapping maps different values of the duration parameter to different transmit power limits.

13. The wireless device of claim 11, wherein the predefined mapping maps different pairs of the duration parameter and channels to different transmit power limits.

* * * * *